United States Patent
Yamaura

(10) Patent No.: US 6,266,602 B1
(45) Date of Patent: Jul. 24, 2001

(54) ROAD SURFACE CONDITION DETERMINATION SYSTEM FOR AUTOMOTIVE VEHICLES AND ANTI-SKID BRAKING SYSTEM HAVING THE SAME

(75) Inventor: Tamotsu Yamaura, Kanagawa (JP)

(73) Assignee: Unisia Jecs Corporation, Kanagawa (JP)

( * ) Notice: Subject to any disclaimer, the term of this patent is extended or adjusted under 35 U.S.C. 154(b) by 0 days.

(21) Appl. No.: 09/506,598

(22) Filed: Feb. 18, 2000

(30) Foreign Application Priority Data

Feb. 18, 1999 (JP) .................................................. 11-039350

(51) Int. Cl.[7] .............................. B60T 8/00; B60T 10/00; G05D 13/00; G05D 16/00; G06F 17/00; G06F 7/00; G06F 19/00

(52) U.S. Cl. .................................. 701/80; 701/1; 701/70; 701/71; 701/78; 701/80-83; 701/91; 303/3; 303/112; 303/152; 303/153; 303/154; 303/121; 303/160; 303/165; 303/168; 318/383; 318/430; 40/584; 40/591; 340/905

(58) Field of Search ................................. 701/80-83, 91, 701/93, 102, 110, 1, 70, 71, 78; 303/121, 160, 165, 168, 3, 112, 152, 154, 163; 318/383, 430; 40/591, 584; 340/905

(56) References Cited

U.S. PATENT DOCUMENTS

| | | | |
|---|---|---|---|
| 5,109,962 | * | 5/1992 | Sato ...................... 192/4 A |
| 5,251,719 | * | 10/1993 | Eto et al. .............................. 180/197 |
| 5,480,221 | * | 1/1996 | Morita et al. ..................... 303/113.5 |
| 5,498,072 | * | 3/1996 | Shimizu ................. 303/191 |
| 5,560,690 | * | 10/1996 | Hattori et al. ..................... 303/116.2 |
| 5,568,962 | * | 10/1996 | Enomoto et al. .......................... 303/3 |
| 5,577,812 | * | 11/1996 | Hirano et al. ........................ 303/112 |
| 5,586,953 | * | 12/1996 | Abo ........................................ 477/47 |
| 5,588,721 | * | 12/1996 | Asano et al. .......................... 303/163 |
| 5,711,585 | * | 1/1998 | Tozu et al. ........................... 303/146 |
| 5,719,565 | * | 2/1998 | Tsuno et al. .......................... 340/905 |
| 5,878,365 | * | 3/1999 | Onogi et al. ............................ 701/70 |
| 5,884,987 | * | 3/1999 | Kawabe et al. ...................... 303/163 |
| 6,045,198 | * | 4/2000 | Naito et al. .......................... 303/154 |
| 6,120,115 | * | 9/2000 | Manabe ................................ 303/152 |

FOREIGN PATENT DOCUMENTS 9-20223    1/1997   (JP) .

* cited by examiner

Primary Examiner—William A. Cuchlinski, Jr.
Assistant Examiner—Ronnie Mancho
(74) Attorney, Agent, or Firm—Sughrue, Mion, Zinn, Macpeak & Seas, PLLC

(57) ABSTRACT

A road surface condition determination system for an automotive vehicle comprises wheel-speed sensors, and a control unit being configured to be electrically connected to the wheel-speed sensors for data-processing a wheel-speed data signal. The control unit calculates a wheel-speed fluctuation of each of the road wheels on the basis of a previous value of the wheel-speed data signal and a current value of the wheel-speed data signal, and calculates an absolute value of the wheel-speed fluctuation of each of the road wheels. A integration circuit is provided to produce a first integrated value of the absolute values of the wheel-speed fluctuations of the road wheels. A smoothing circuit is provided to make a smoothing operation to the integrated value to produce a smoothed value. A road-surface condition determining section is also provided to determine a road surface condition on the basis of the smoothed value. In an automotive vehicle with an ABS system, a skid control section uses the result of discrimination between good and bad roads, executed by the road-surface condition determining section, so as to vary a pressure-reduction threshold depending on the road surface condition detected.

18 Claims, 14 Drawing Sheets

WHEEL SPEED(VWFR, VWFL,VWRR) & WHEEL ACCELERATION/DECELERATION
(VWDFR, VWDFL,VWDRR)–DURING GOOD-ROAD DRIVING

EXTRACTION OF WHEEL-SPEED FLUCTUATION DATA (HVWDFR, HVWDFL, HVWDRR, 10Hz-H.P.F) & SKID-CONTROL-DEPENDENT WHEEL-SPEED FLUCTUATION DATA (LVWDFR, LVWDFL, LVWDRR, 5Hz-L.P.F.)- DURING GOOD-ROAD DRIVING

FIG.10

VARIATIONS IN INTEGRATED VALUE |ΣAHVWD|OF ABSOLUTE VALUES (AHVWDFR, AHVWDFL, AHVWDRR) OF HIGH-PASS-FILTERED WHEEL-SPEED FLUCTUATIONS, INTERGRATED VALUE |ΣALVWD| OF ABSOLUTE VALUES (ALVWDFR, ALVWDFL, ALVWDRR) OF LOW-PASS-FILTERED WHEEL-SPEED FLUCTUATIONS, AND VARIATIONS IN DERIVATIVE OF WHEEL-SPEED-FLUCTUATION CORRECTION VALUE (SVWD)-DURING GOOD-ROAD DRIVING

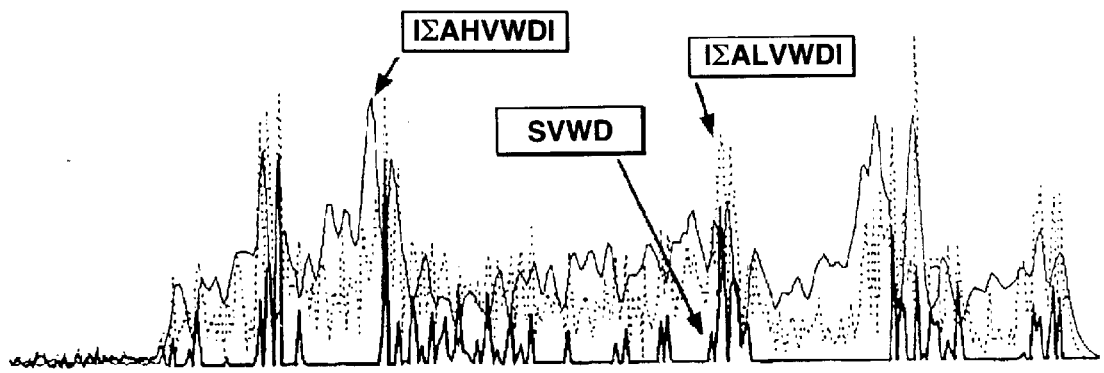

FIG.11

VARIATIONS IN INTEGRATED VALUE OF WHEEL-SPEED-FLUCTUATION CORRECTION VALUE (SVWD) & VARIATIONS IN SMOOTHED VALUE (AVWD, 0.5Hz-L.P.F.)- DURING GOOD-ROAD DRIVING

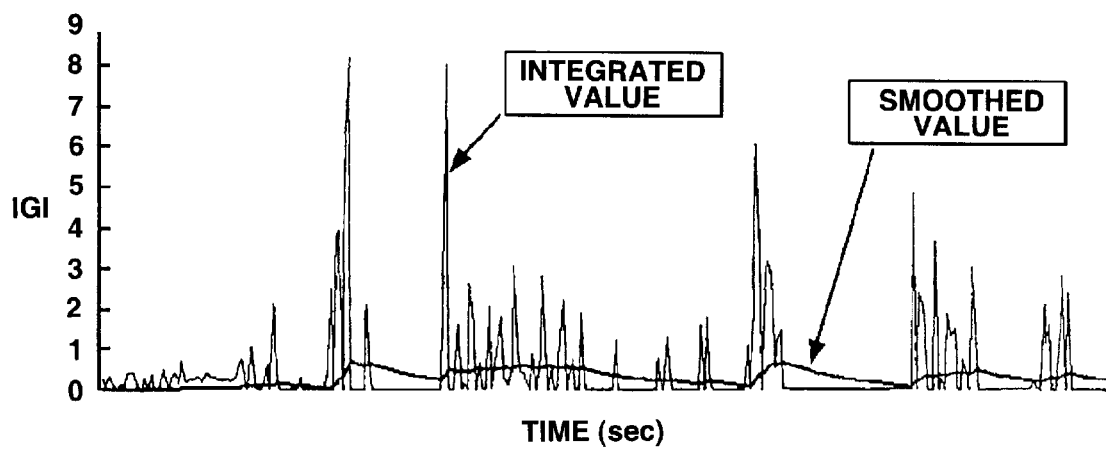

WHEEL SPEED(VWFR, VWFL,VWRR) & WHEEL ACCELERATION/DECELERATION
(VWDFR, VWDFL,VWDRR)–DURING BAD-ROAD DRIVING

EXTRACTION OF WHEEL-SPEED FLUCTUATION DATA (HVWDFR, HVWDFL, HVWDRR, 10Hz-H.P.F) & SKID-CONTROL-DEPENDENT WHEEL-SPEED FLUCTUATION DATA (LVWDFR,LVWDFL,LVWDRR, 5Hz-L.P.F.)- DURING BAD-ROAD DRIVING

FIG.14

VARIATIONS IN INTEGRATED VALUE |ΣAHVWD| OF ABSOLUTE VALUES (AHVWDFR, AHVWDFL, AHVWDRR) OF HIGH-PASS-FILTERED WHEEL-SPEED FLUCTUATIONS, INTERGRATED VALUE |ΣALVWD| OF ABSOLUTE VALUES (ALVWDFR, ALVWDFL, ALVWDRR) OF LOW-PASS-FILTERED WHEEL-SPEED FLUCTUATIONS, AND VARIATIONS IN DERIVATIVE OF WHEEL-SPEED-FLUCTUATION CORRECTION VALUE (SVWD)-DURING BAD-ROAD DRIVING

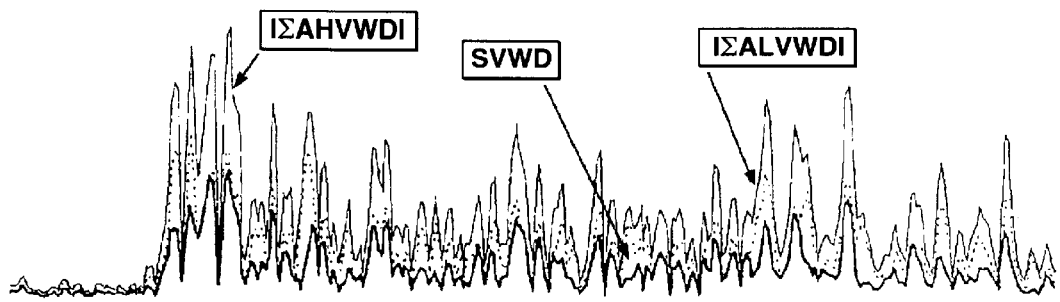

FIG.15

VARIATIONS IN INTEGRATED VALUE OF WHEEL-SPEED-FLUCTUATION CORRECTION VALUE (SVWD) & VARIATIONS IN SMOOTHED VALUE (AVWD, 0.5Hz-L.P.F.)- DURING BAD-ROAD DRIVING

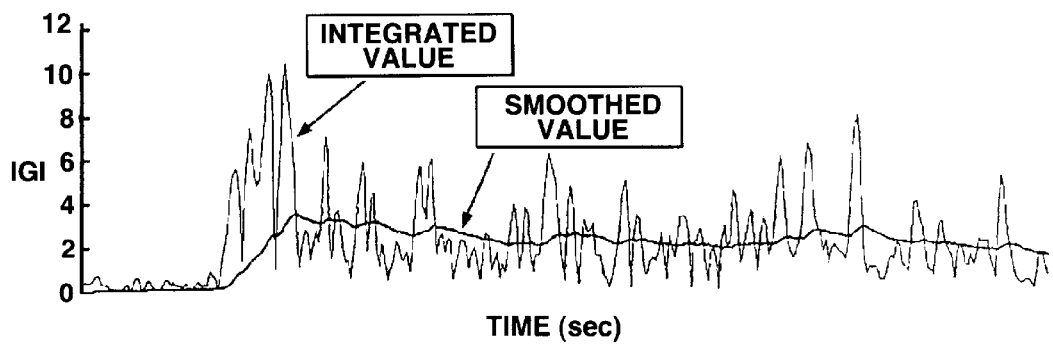

COMPARISON BETWEEN VARIATIONS IN SMOOTHED VALUE (AVWD) CALCULATED DURING BAD-ROAD DRIVING AND VARIATIONS IN SMOOTHED VALUE(AVWD) CALCULATED DURING GOOD-ROAD DRIVING

COMPARISON OF FREQUENCY CHARACTERISTICS OF WHEEL ACCELERATION/DECELERATION DURING BRAKING, UNDER VARIOUS ROAD SURFACE CONDITIONS

ROAD SURFACE CONDITION DETERMINATION SYSTEM FOR AUTOMOTIVE VEHICLES AND ANTI-SKID BRAKING SYSTEM HAVING THE SAME

BACKGROUND OF THE INVENTION

1. Field of the Invention

The present invention relates to the improvements of a road surface condition determination system for automotive vehicles, and particularly to an anti-skid braking system used on automotive vehicles having a road surface condition determination system.

2. Description of the Prior Art

In recent years, there have been proposed and developed various road surface condition determination systems capable of determining or discriminating the road surface condition by way of processing input information signals from wheel speed sensors provided each road wheel. One such road surface determination system has been disclosed in Japanese Patent Provisional Publication No. 9-020223. The prior art system disclosed in the Japanese Patent Provisional Publication No. 9-020223, has a wheel acceleration arithmetic-calculation section, a filtering section (a second-order high-pass filter), a variance arithmetic-calculation section, and a bad-road determination section. The wheel acceleration arithmetic-calculation section calculates four wheel acceleration/deceleration on the basis of input information signals from wheel speed sensors located at each road wheel. The wheel acceleration/deceleration data will be hereinafter referred to simply as a "wheel acceleration data", since the positive sign of the wheel acceleration data means an accelerating state, whereas the negative sign of the wheel acceleration data means a decelerating state. The filtering section makes the two-order high-pass filtering process with respect to the four wheel acceleration data to produce four high-pass-filtered wheel acceleration data signals for each arithmetic-operation cycle. The variance arithmetic-calculation section calculates a variance DVWB for the high-pass-filtered wheel acceleration data signal ($DVWF_{(i)}$, $DVWF_{(2)}$, ..., $DVWF_{(n-1)}$, $DVWF_{(n)}$) obtained by a plurality of consecutive arithmetic operations (of a predetermined sampling number of n) executed for each individual high-pass-filtered data signal, from a predetermined expression $DVWB = \{DVWF_{(1)}^2 + \ldots + DVWF_{(n)}^2\}/n$. The bad-road determination section determines, on the basis of the magnitude of the variance DVWB, as to whether the vehicle is driving on a bad road or on a good road. In arithmetically calculating the variance DVWB within the electronic control unit (ECU), the previously-noted prior art system requires a large number of high-pass-filtered data ($DVWF_{(1)}$, $DVWF_{(2)}$, ..., $DVWF_{(n-1)}$, $DVWF_{(n)}$) obtained by a plurality of consecutive arithmetic operations (of the predetermined sampling number of n) executed cyclically for each individual high-pass-filtered data. The amount of data needed to calculate the variances $DVWB_{FR}$, $DVWB_{FL}$, $DVWB_{RR}$, and $DVWB_{RL}$, for the four acceleration data at four road wheels is 4×n at the minimum. Such a comparatively long arithmetic-operation time for the data needed to compute the variance DVWB prevents the system from determining or discriminating between bad and good roads in real time. In other words, in the prior art system, there is a phase lag corresponding to a plurality of consecutive arithmetic operations needed to compute the variances ($DVWB_{FR}$, $DVWB_{FL}$, $DVWB_{RR}$, and $DVWB_{RL}$). Thus, there is a tendency that the vehicle has already passed through the bad road at the time when the bad-road discrimination section determines that the vehicle is driving on the bad road. Due to such a great amount of necessary data, the system requires increased memory capacities. This increases the total production costs of the system. To provide maximum effective braking depending on the road surface condition such as during bad-road driving on gravel roads or good-road driving on dry pavements, an automotive vehicle with an anti-skidbraking system (ABS) often uses the result of determination of the road surface condition. In the previously-described prior art system, when the ECU determines that the vehicle is driving on the bad road, the ABS operates to set the wheel-brake cylinder pressure at a higher level rather than during the good-road driving, so as to effectively reduce a braking distance of the vehicle. In such an anti-skid braking system which uses the result of discrimination between bad and good roads, in order to effectively extract frequency components corresponding to wheel-speed fluctuations based on input (input vibrations transmitted via the road wheels) from the road surface while removing or eliminating frequency components corresponding to wheel-speed fluctuations occurring owing to skid control from the wheel acceleration data, a higher-order filtering process (containing a second-order filtering process) is often executed. Commonly, such a higher-order filtering process uses a specified cutoff frequency higher than a resonance frequency of unsprung mass in a vehicle suspension vibrating system. Therefore, the road surface condition determination system containing a higher-order filter tends to undesiredly attenuate the amplitude of the frequency component corresponding to the wheel-speed fluctuations (the time rate of change of the wheel speed data). This lowers the accuracy of arithmetic operations, thus deteriorating the accuracy of determination between bad and good roads. The lowered bad-road determination accuracy may result in a lag in the pressure-reduction timing during skid control.

SUMMARY OF THE INVENTION

Accordingly, it is an object of the invention to provide a road surface condition determination system for automotive vehicles which can reconcile reduced memory capacities and enhanced accuracy of determination between bad and good roads, and make a discrimination between bad and good roads in real time.

It is another object of the invention to provide an anti-skid braking system having a road surface condition determination system, which avoids the aforementioned disadvantages of the prior art.

It is a further object of the invention to provide an anti-skid braking system having a road surface condition determination system, which can accurately execute a discrimination between bad and good roads even in the presence of skid-control dependent wheel-speed fluctuations during skid control, and thus ensuring enhanced skid-control accuracy.

In order to accomplish the aforementioned and other objects of the present invention, a road surface condition determination system for an automotive vehicle, comprises wheel-speed sensors detecting wheel speeds of each of road wheels, and a control unit being configured to be electrically connected to the wheel-speed sensors for processing a wheel-speed data signal from each of the wheel-speed sensors, the control unit comprising a wheel-speed fluctuation arithmetic-calculation section which calculates a wheel-speed fluctuation of each of the road wheels on the basis of a previous value of the wheel-speed data signal and a current value of the wheel-speed data signal, a first absolute-value arithmetic-calculation section which calculates an absolute value of the wheel-speed fluctuation of each of the road wheels, a first integration section which produces a first integrated value of the absolute values of the wheel-speed fluctuations of the road wheels, a smoothing section which makes a smoothing operation to the first integrated value to produce a smoothed value, and a road-surface condition determining section which determines a road surface condition on the basis of the smoothed value.

According to another aspect of the invention, an anti-skid braking system having a road surface condition determination system for an automotive vehicle, comprises wheel-speed sensors detecting wheel speeds of each of road wheels, a hydraulic brake unit regulating wheel-brake cylinder pressures of wheel-brake cylinders mounted to each of the road wheels, and a control unit being configured to be electrically connected to the wheel-speed sensors and hydraulic brake unit for processing a wheel-speed data signal from each of the wheel-speed sensors and for execute skid control based on the wheel-speed data signal from each of the wheel-speed sensors, the control unit comprising a wheel-speed fluctuation arithmetic-calculation section which calculates a wheel-speed fluctuation of each of the road wheels on the basis of a previous value of the wheel-speed data signal and a current value of the wheel-speed data signal, a first absolute-value arithmetic-calculation section which calculates an absolute value of the wheel-speed fluctuation of each of the road wheels, a first integration section which produces a first integrated value of the absolute values of the wheel-speed fluctuations of the road wheels, a skid-control dependent wheel-speed fluctuation arithmetic-calculation section which calculates a skid-control dependent wheel-speed fluctuation of each of the road wheels, occurring due to skid control, on the basis of a previous value of the wheel-speed data signal and a current value of the wheel-speed data signal, a second absolute-value arithmetic-calculation section which calculates an absolute value of the skid-control dependent wheel-speed fluctuation of each of the road wheels, a second integration section which produces a second integrated value of the absolute values of the skid-control dependent wheel-speed fluctuations of the road wheels, a correction section which calculates a wheel-speed fluctuation correction value by subtracting the second integrated value from the first integrated value, a smoothing section which makes a smoothing operation to the wheel-speed fluctuation correction value to produce a smoothed value, a road-surface condition determining section which determines a road surface condition on the basis of the smoothed value, and a skid control section preventing wheel lock of each of the road wheels in response to the wheel-speed data signal from each of the wheel-speed sensors, the skid control section executing the skid control depending on the road surface condition determined by the road-surface condition determining section.

According to a further aspect of the invention, a road surface condition determination system for an automotive vehicle, comprises wheel-speed sensors detecting wheel speeds of each of road wheels, and a control unit being configured to be electrically connected to the wheel-speed sensors for processing a wheel-speed data signal from each of the wheel-speed sensors, the control unit comprising a wheel-acceleration arithmetic-calculation section which calculates a wheel-acceleration data signal as a difference between a previous value of the wheel-speed data signal and a current value of the wheel-speed data signal, a wheel-speed fluctuation arithmetic-calculation section which calculates a wheel-speed fluctuation of each of the road wheels on the basis of the wheel-acceleration data signal, a first absolute-value arithmetic-calculation section which calculates an absolute value of the wheel-speed fluctuation of each of the road wheels, a first integration section which produces a first integrated value of the absolute values of the wheel-speed fluctuations of the road wheels, a smoothing section which makes a smoothing operation to the first integrated value to produce a smoothed value, and a road-surface condition determining section which determines a road surface condition on the basis of the smoothed value.

According to a still further aspect of the invention, an anti-skid braking system having a road surface condition determination system for an automotive vehicle, comprises wheel-speed sensors detecting wheel speeds of each of road wheels, a hydraulic brake unit regulating wheel-brake cylinder pressures of wheel-brake cylinders mounted to each of the road wheels, and a control unit being configured to be electrically connected to the wheel-speed sensors and hydraulic brake unit for processing a wheel-speed data signal from each of the wheel-speed sensors and for execute skid control based on the wheel-speed data signal from each of the wheel-speed sensors, the control unit comprising a wheel-acceleration arithmetic-calculation section which calculates a wheel-acceleration data signal as a difference between a previous value of the wheel-speed data signal and a current value of the wheel-speed data signal, a wheel-speed fluctuation arithmetic-calculation section which calculates a wheel-speed fluctuation of each of the road wheels on the basis of a previous value of the wheel-acceleration data signal and a current value of the wheel-acceleration data signal, a first absolute-value arithmetic-calculation section which calculates an absolute value of the wheel-speed fluctuation of each of the road wheels, a first integration section which produces a first integrated value of the absolute values of the wheel-speed fluctuations of the road wheels, a skid-control dependent wheel-speed fluctuation arithmetic-calculation section which calculates a skid-control dependent wheel-speed fluctuation of each of the road wheels, occurring due to skid control, on the basis of a previous value of the wheel-acceleration data signal and a current value of the wheel-acceleration data signal, a second absolute-value arithmetic-calculation section which calculates an absolute value of the skid-control dependent wheel-speed fluctuation of each of the road wheels, a second integration section which produces a second integrated value of the absolute values of the skid-control dependent wheel-speed fluctuations of the road wheels, a correction section which calculates a wheel-speed fluctuation correction value by subtracting the second integrated value from the first integrated value, a smoothing section which makes a smoothing operation to the wheel-speed fluctuation correction value to produce a smoothed value, a road-surface condition determining section which determines a road surface condition on the basis of the smoothed value, and a skid control section preventing wheel lock of each of the road wheels in response to the wheel-speed data signal from each of the wheel-speed sensors, the skid control section executing the skid control depending on the road surface condition determined by the road-surface condition determining section.

BRIEF DESCRIPTION OF THE DRAWINGS

FIG. 10 is a timing chart illustrating waveforms of data signals for an integrated value |ΣAHVWD| of absolute values of 10 Hz-high-pass-filtered wheel-speed fluctuations, an integrated value |ΣALVWD| of absolute values of 5 Hz-low-pass-filtered wheel-speed fluctuations, and a derivative (a differentiated value) of the wheel-speed-fluctuation correction value SVWD, produced during good-road driving.

FIG. 11 is a timing chart illustrating variations in an integrated value of the wheel-speed-fluctuation correction value SVWD and a smoothed value AVWD, produced during good-road driving.

FIG. 14 is a timing chart illustrating waveforms of data signals for an integrated value |ΣAHVWD| of absolute values of 10 Hz-high-pass-filtered wheel-speed fluctuations, an integrated value |ΣALVWD| of absolute values of 5 Hz-low-pass-filtered wheel-speed fluctuations, and a derivative (a differentiated value) of the wheel-speed-fluctuation correction value SVWD obtained as the difference between the two integrated values |ΣAHVWD| and |ΣALVWD|, produced during bad-road driving.

FIG. 15 is a timing chart illustrating variations in an integrated value of the wheel-speed-fluctuation correction value SVWD and a smoothed value AVWD, produced during bad-road driving.

DESCRIPTION OF THE PREFERRED EMBODIMENTS

Figure 2:
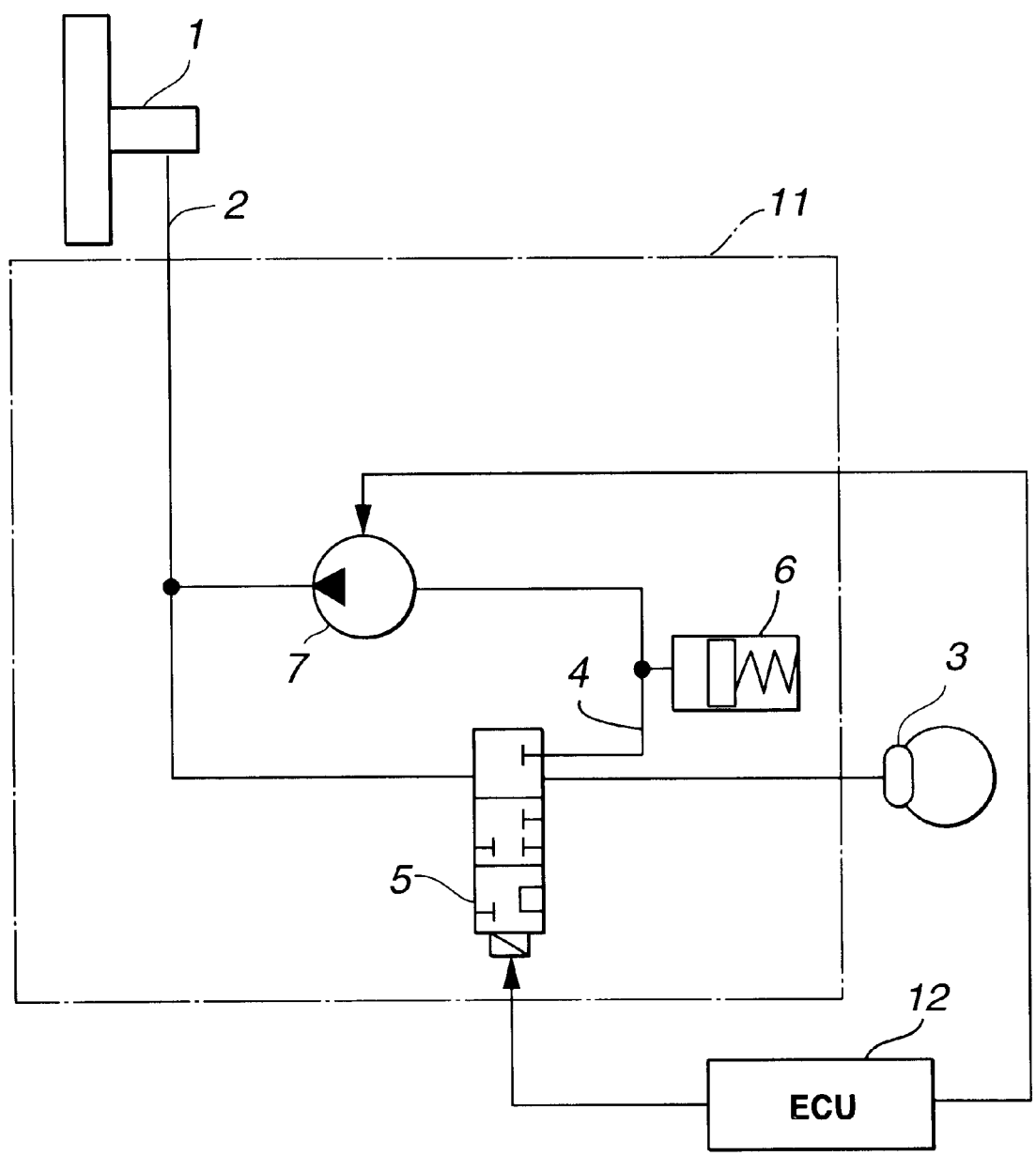
FIG. 2 is a hydraulic system diagram illustrating a hydraulic actuator being applicable to the anti-skid braking system of the embodiment shown in FIG. 1.
Figure 3:
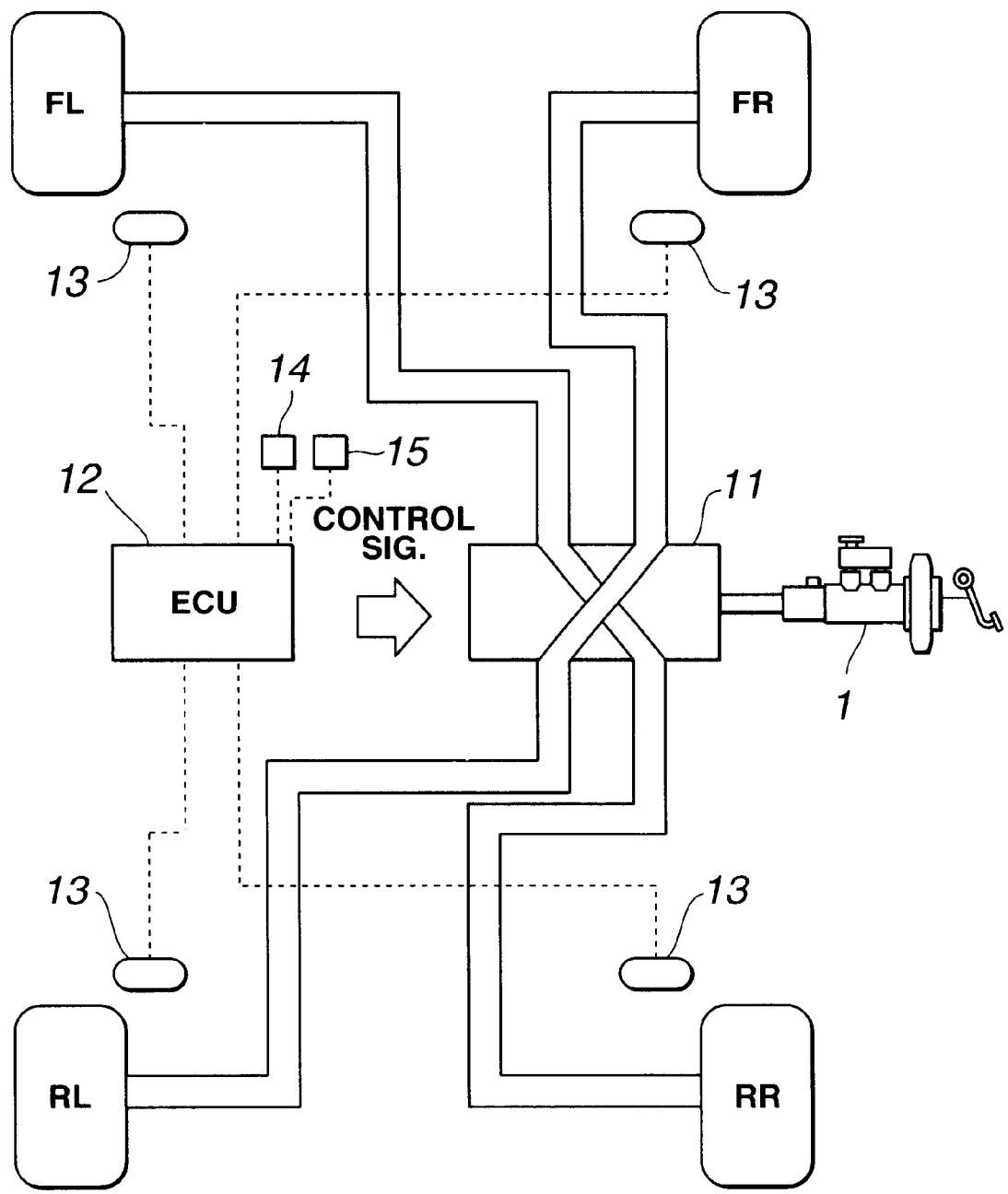
FIG. 3 is the system layout of the anti-skid braking system having the road surface condition determination system of the embodiment.

Referring now to the drawings, particularly to FIGS. 2 and 3, the anti-skid braking system with the road surface condition determination system of the invention is exemplified in an automotive vehicle equipped with a four-channel ABS diagonal brake-circuit layout. In FIGS. 2 and 3, reference sign 1 denotes a master cylinder. The master cylinder 1 may be constructed by a typical tandem master cylinder with two pistons in tandem. For the purpose of illustrative simplicity, FIG. 2 merely shows the connection relationship of an ABS closed loop control circuit containing a hydraulic brake control unit (or a hydraulic modulator) 11 with respect to only one of the four wheel-brake cylinders. As the brake pedal is depressed, the piston in the master cylinder 1 applies pressure to brake fluid. The pressure forces the brake fluid through the inlet/outlet port of the master cylinder 1 into a hydraulic brake circuit 2. Then, the pressure is regulated by means of the hydraulic modulator 11 fluidly disposed in the hydraulic brake circuit 2, and the regulated pressure is supplied to the wheel-brake cylinder 3. The hydraulic modulator 11 includes at least a drain circuit 4, and a directional control valve 5. In order to properly regulate or control the brake-fluid pressure to the wheel-brake cylinder 3, the directional control valve 4 is designed to switch among three operating modes, namely a first operating mode or a pressure build-up mode where the upstream side (the master-cylinder side) of the brake circuit 2 is communicated with the downstream side (the wheel-brake cylinder side) of the brake circuit 2, a second operating mode or a pressure-reduction mode where the brake fluid in the wheel-brake cylinder 3 is relieved within toward the drain circuit 4, and a third operating mode or a pressure-hold mode where the brake circuit 2 is shut off and thus the brake-fluid pressure in the wheel-brake cylinder 3 is held constant. For the purpose of illustrative simplicity, although only one directional control valve 5 is shown in FIG. 2, actually, as can be appreciated from the simplified arrangement of the four-channel ABS system for diagonal brake-circuit layout shown in FIG. 3, the hydraulic modulator 11 has a plurality of directional control valves usually comprised of electromagnetic solenoid valves, so as to independently regulate the fluid pressure to each individual wheel cylinder. Also, the hydraulic modulator 11 has a pressure accumulator 6 disposed in each drain circuit 4, and a return pump 7, often called an "ABS pump". The pressure accumulator 6 is designed to temporarily store energy by holding the surplus brake fluid, which will occur anytime that there is a drop in system pressure (especially during the pressure-reduction mode). The return pump 7 is designed to carry or return the brake fluid flowing from the wheel-brake cylinders 3 via the individual accumulators 6 into the correct circuit of the master cylinder 1 (i.e., the upstream side of the directional control valve 5). With the previously-noted arrangement of the ABS system shown in FIGS. 2 and 3, the brake-fluid pressure to each wheel-brake cylinder can be properly regulated or controlled. The operation (switching among valve positions) of the directional control valve 5 associated with each wheel-brake cylinder 3 and the operation (switching between inoperative and operative states) of the return pump 7 are electrically controlled by means of an electronic control unit (ECU) or an electronic control module (ECM) 12. The electronic control unit 12 usually comprises a microcomputer. Although it is not clearly shown in FIG. 3, the electronic control unit 12 includes a central processing unit (CPU) that performs necessary arithmetic-calculations, processes informational data, compares signals from the sensors to preprogrammed threshold values, and makes necessary decisions of acceptance, memories (RAM, ROM), and an input/output interface. Actually, the ECU 12 performs various data processing actions shown in FIGS. 4, 5 and 7 or shown in FIGS. 4, 5 and 19 which will be fully described later. The input interface of the control unit 12 receives input informational data from various engine/vehicle sensors/switches, that is, four wheel speed sensors (13, 13, 13, 13), a longitudinal acceleration sensor 14, and a brake switch 15. The four wheel speed sensors 13 placed at the respective road wheels (FL, FR, RR, RL) are provided to continuously monitor or detect each individual wheel's rotational speed and relay this signal to the input interface of the electronic control unit 12. The longitudinal acceleration sensor 14 is placed at the vehicle body, to continuously monitor or detect longitudinal acceleration/deceleration Xg exerted on the vehicle. The brake switch 15 is designed to generate a switched-ON signal (or a high-voltage signal) when the brake pedal is depressed and thus the brakes are applied. Conversely, when the brake pedal is undepressed and thus the brakes are released, the input interface of the ECU 12 receives a switched-OFF signal (or no electrical signal) from the brake switch 15. The memories store preprogrammed or predetermined data such as various threshold values and temporarily store the results of arithmetic-calculations and the necessary decisions made by the CPU. The output interface of the ECU 12 is configured to be electronically connected to each directional control valve 5 of the hydraulic modulator 11, to produce a control command signal to the directional control valve 5 associated with each individual wheel-brake cylinder 3 as well as the return pump 7, on the basis of the results of arithmetic-calculations and decisions performed by the CPU.

Figure 4:
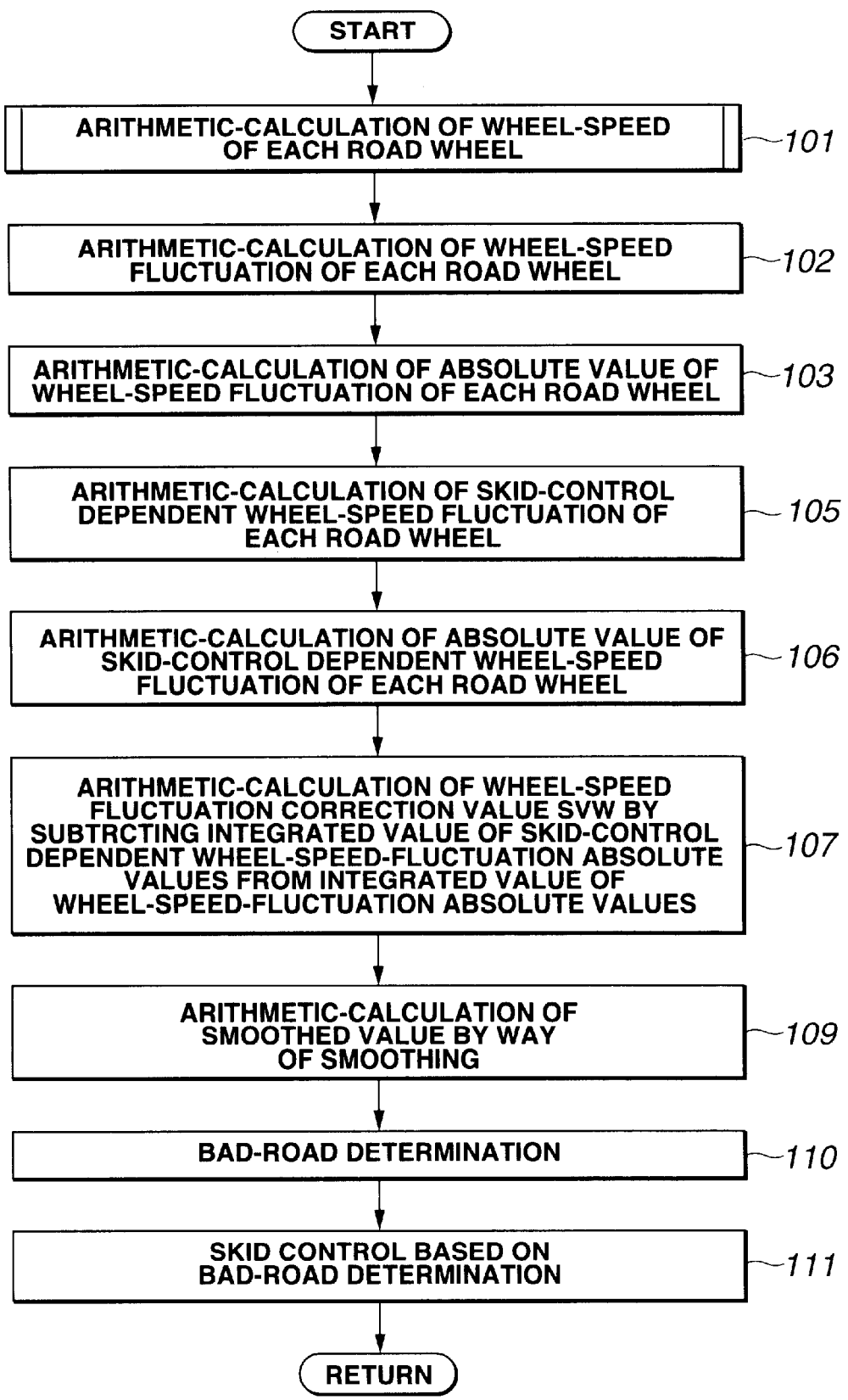
FIG. 4 is a flow chart illustrating a program executed by the system of the embodiment.

Hereunder described in detail in reference to FIG. 4 is the main routine executed by the system of the embodiment and preprogrammed in the CPU of the electronic control unit 12. The main routine shown in FIG. 4 is executed as time-triggered routines to be triggered every predetermined time intervals such as 10 msec.

At step 101, the arithmetic section of the ECU calculates a front-left wheel speed VWFL, a front-right wheel speed VWFR, a rear-left wheel speed VWRL, and a rear-right wheel speed VWRR, on the basis of the latest up-to-date information (the more recent wheel speed indicative data signals) from the four wheel speed sensors 13. At step 102, a basic front-left wheel-speed fluctuation HVWFL, a basic front-right wheel-speed fluctuation HVWFR, a basic rear-left wheel-speed fluctuation HVWRL, and a basic rear-right wheel-speed fluctuation HVWRR are arithmetically calculated respectively as a time rate of change of the front-left wheel speed VWFL, a time rate of change of the front-right wheel speed VWFR, a time rate of change of the rear-left wheel speed VWRL, and a time rate of change of the rear-right wheel speed VWRR. The basic wheel-speed fluctuation data (HVWFL, HVWFR, HVWRL, HVWRR) will be hereinafter referred to simply as "wheel-speed fluctuation data". At step 103, conversion-to-absolute-value is made to the four wheel-speed fluctuation data (HVWFL, HVWFR, HVWRL, HVWRR), that is to say, an absolute value AHVWFL of the front-left wheel-speed fluctuation HVWFL, an absolute value AHVWFR of the front-right wheel-speed fluctuation HVWFR, an absolute value AHVWRL of the rear-left wheel-speed fluctuation HVWRL, and an absolute value AHVWRR of the rear-right wheel-speed fluctuation HVWRR are computed. At step 105, a skid-control dependent front-left wheel-speed fluctuation LVWFL occurring at the front-left road wheel owing to skid control, a skid-control dependent front-right wheel-speed fluctuation LVWFR occurring at the front-right road wheel owing to skid control, a skid-control dependent rear-left wheel-speed fluctuation LVWRL occurring at the rear-left road wheel owing to skid control, and a skid-control dependent rear-right wheel-speed fluctuation LVWRR occurring at the rear-right road wheel owing to skid control, are computed. At step 106, conversion-to-absolute-value is made to the four skid-control dependent wheel-speed fluctuation data (LVWFL, LVWFR, LVWRL, LVWRR), that is to say, an absolute value ALVWFL of the skid-control dependent front-left wheel-speed fluctuation LVWFL, an absolute value ALVWFR of the skid-control dependent front-right wheel-speed fluctuation LVWFR, an absolute value ALVWRL of the skid-control dependent rear-left wheel-speed fluctuation LVWRL, and an absolute value ALVWRR of the skid-control dependent rear-right wheel-speed fluctuation LVWRR are computed. At step 107, a wheel-speed fluctuation correction value SVW is arithmetically calculated by subtracting an integrated value of the four absolute values (ALVWFL, ALVWFR, ALVWRL, ALVWRR) of the skid-control dependent wheel-speed fluctuation data (LVWFL, LVWFR, LVWRL, LVWRR) from an integrated value of the four absolute values (AHVWFL, AHVWFR, AHVWRL, AHVWRR) of the wheel-speed fluctuation data (HVWFL, HVWFR, HVWRL, HVWRR). At step 109, a smoothed value AVW is computed by way of a smoothing operation made to the wheel-speed fluctuation correction value SVW produced through step 107. At step 110, the ECU 12 determines or discriminates between bad and good roads by comparing the smoothed value AVW to a predetermined threshold value such as 2G (G denotes a gravitational acceleration unit). At step 111, the ECU 12 executes skid control on the basis of the result of bad-road/good-road determination made at step 110. As appreciated from the above, steps 101 through 110 corresponds to arithmetic operations and comparing operation executed within the road surface condition determination system of the embodiment, whereas step 111 corresponds to the skid control routine performed within the anti-skid braking system (ABS system) of the embodiment.

Figure 5:
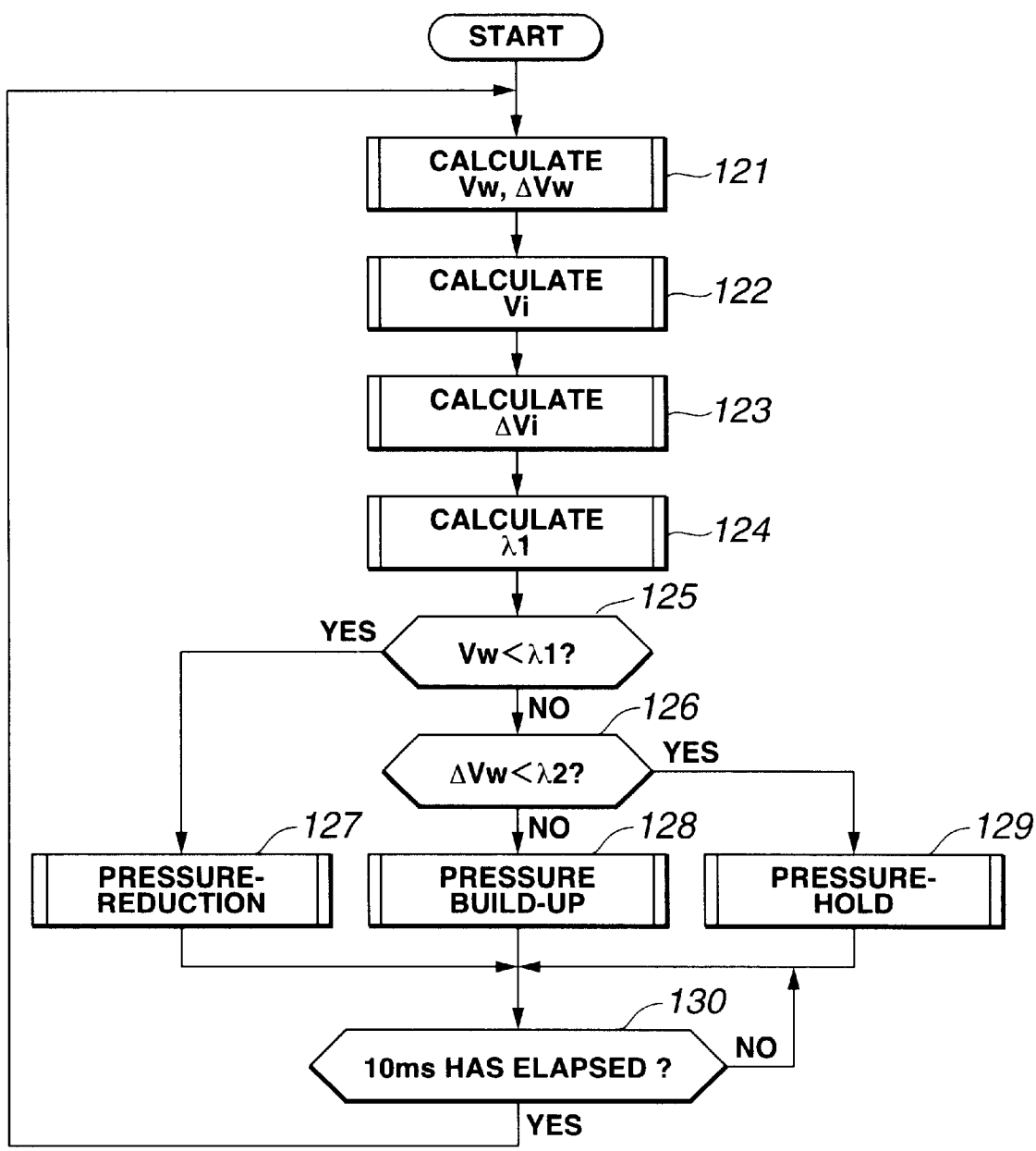
FIG. 5 is a flow chart illustrating a skid-control routine executed by the anti-skid braking system of the embodiment.

Hereinbelow described in detail in reference to FIG. 5 is the skid control routine related to step 111 of FIG. 4 and executed by the anti-skid braking system of the embodiment.

At step 121, the more recent wheel speed indicative data signals (i.e., the latest up-to-date information) from the four wheel speed sensors 13 are read, and then a wheel speed VW at each road wheel (the front-right wheel speed VWFR, the front-left wheel speed VWFL, the rear-right wheel speed VWRR, and the rear-left wheel speed VWRL) is arithmetically calculated. Then, at the same step 121, an acceleration/deceleration rate (simply a wheel acceleration data $\Delta$VW) at each road wheel (a front-right wheel acceleration $\Delta$VWFR, a front-left wheel acceleration $\Delta$VWFL, a rear-right wheel acceleration $\Delta$VWRR, and a rear-left wheel acceleration ΔVWRL) is arithmetically calculated. At step 122, a pseudo vehicle speed Vi is arithmetically calculated or determined by a predetermined or pre-programmed arithmetic processing in a conventional manner. In step 123, a vehicle deceleration ΔVi is arithmetically calculated or determined by a predetermined expression $\Delta Vi=Vi_{(n-1)}-Vi_{(n)}$, where $Vi_{(n-1)}$ denotes a previous value of the pseudo vehicle speed Vi, whereas $Vi_{(n)}$ denotes a current value (a more recent data) of the pseudo vehicle speed Vi. The previous value $Vi_{(n-1)}$ corresponds to a pseudo vehicle speed value one cycle before in comparison with the current arithmetic-calculation routine for the pseudo vehicle speed Vi. In step 124, a pressure-reduction threshold value λ1 is arithmetically calculated from the following expression.

$$\lambda 1 = Vi \times K - x \text{(unit: Km/h)}$$

where K denotes a constant such as 0.95, and x denotes a correction value being variable depending on whether the road-surface condition corresponds to high-$\mu$ road or low-$\mu$ road (concretely, in the shown embodiment, the correction value x is set at 8 during vehicle driving on the high-$\mu$ road, and set at 4 during vehicle driving on the low-$\mu$ road).

In step 125, each of the wheel speeds (VWFR, VWFL, VWRR, VWRL) is compared to the pressure-reduction threshold value λ1, and a check is made to determine whether the respective wheel speed VW is less than the pressure-reduction threshold value λ1. When the answer to step 125 is in the affirmative (YES), i.e., in case of VW<λ1, the program proceeds to step 127. Conversely, when the answer to step 125 is in the negative (NO), i.e., in case of VW≧λ1, the program proceeds to step 126. In step 126, each of the wheel acceleration data (ΔVWFR, ΔVWFL, ΔVWRR, ΔVWRL) is compared to a predetermined pressure-hold threshold value λ2, and a check is made to determine whether the respective wheel acceleration data ΔVW is less than the pressure-hold threshold value λ2. When the answer to step 126 is affirmative (YES), i.e., in case of ΔVW<λ2, step 129 occurs. Conversely, when the answer to step 126 is negative (NO), i.e., in case of ΔVW≧λ2, step 128 occurs. The wheel acceleration data ΔVW at each road wheel is defined as the time rate of change of each of the wheel speeds (VWFR, VWFL, VWRR, VWRL). Thus, when the inequality ΔVW<λ2 is satisfied in step 126, the CPU of the electronic control unit 12 determines or decides that the wheel speed VW is almost equal to the pseudo vehicle speed Vi, and then the procedure flows to step 129, so as to execute the pressure-hold mode (or the pressure-hold control) with the directional control valve (the solenoid valve) 5 held at its pressure-holding valve position. In contrast, when the inequality ΔVW≧λ12 is satisfied in step 126, the CPU of the ECU 12 decides that the wheel speed VW is returning to the pseudo vehicle speed Vi, and thus the procedure flows to step 128, so as to execute the pressure build-up mode (or the pressure build-up control) with the control valve 5 held at its pressure-increasing valve position. On the other hand, when the inequality VW<λ1 is satisfied in step 125, the CPU of the ECU 12 decides that a skid (a wheel lock-up condition) starts to develop, and thus the procedure flows to step 127, so as to execute the pressure-reduction mode (or the pressure-reduction control) with the control valve 5 held at its pressure-decreasing valve position.

Figure 7:
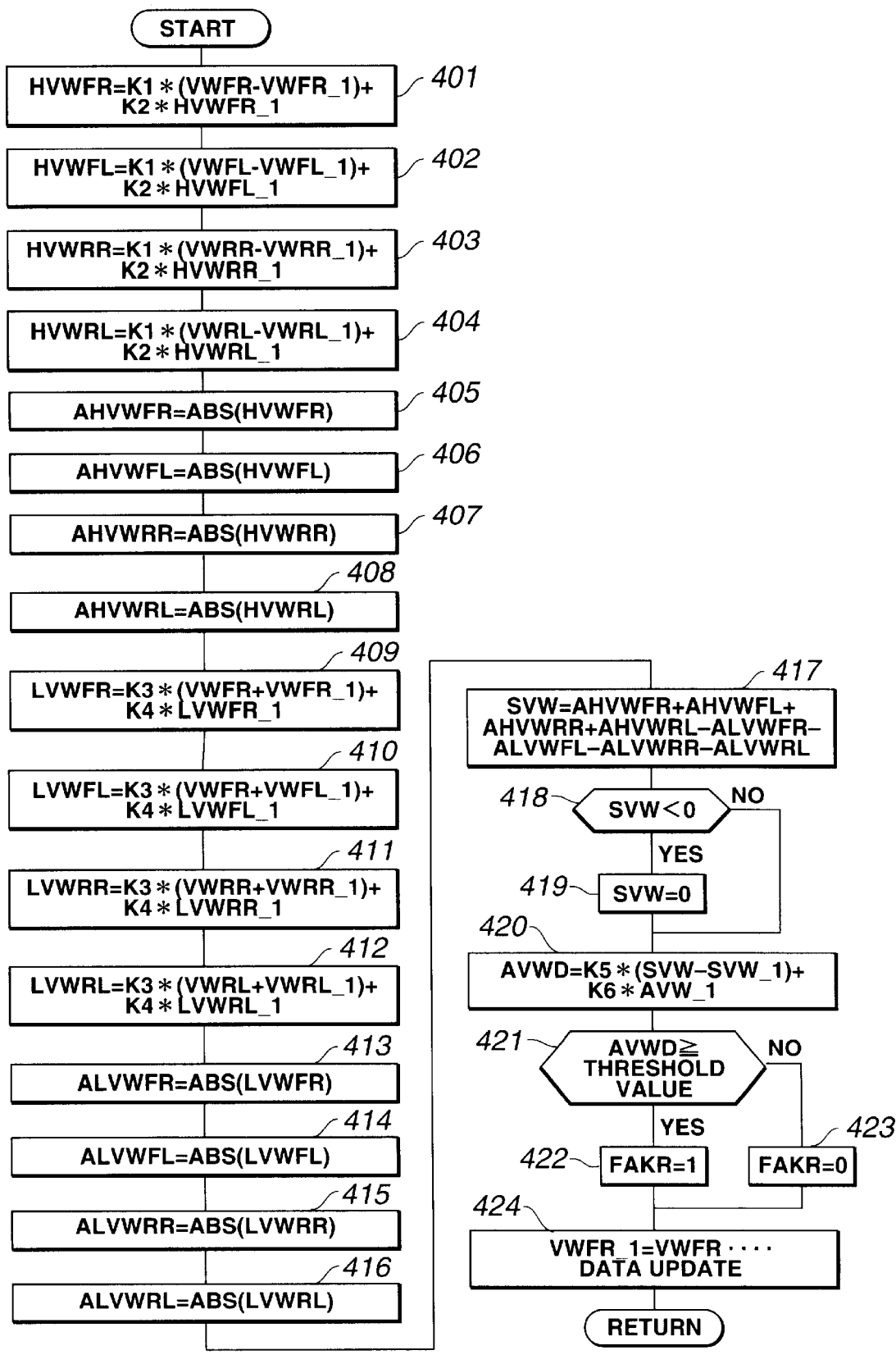
FIG. 7 is a flow chart illustrating details of a bad-road determination routine related to the system components of the road surface condition determination system of the first embodiment shown in FIG. 6.
Figure 19:
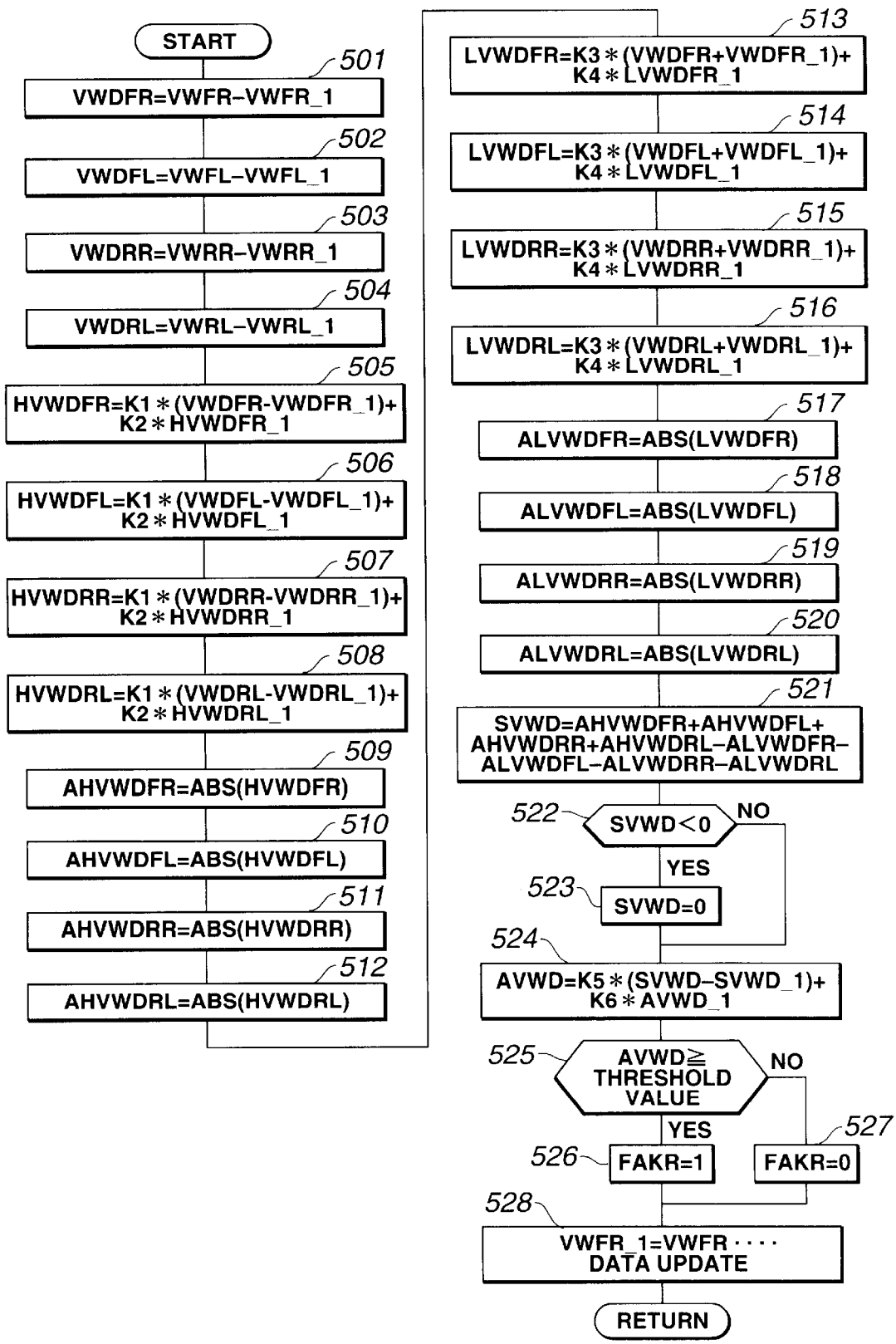
FIG. 19 is a flow chart illustrating details of a bad-road determination routine related to the system components of the road surface condition determination system of the second embodiment shown in FIG. 18.

Subsequently to steps 127, 128, or 129, step 130 occurs. In step 130, a test is made to determine whether a predetermined time period $T_{10}$ such as 10 msec has been elapsed from the beginning of the current skid-control routine. When the answer to step 130 is affirmative (YES), the program returns to step 121, so as to execute the next cycle following the current cycle. In other words, the arithmetic processing or the skid control routine shown in FIG. 5 is executed as time-triggered routines to be triggered every predetermined intervals such as 10 milliseconds. In the anti-skid braking system having the road surface condition determination system of the embodiment, note that the pressure-reduction threshold value λ1 varies depending on the result of discrimination between good and bad roads. Briefly speaking, the pressure-reduction threshold value λ1 varies depending upon whether a bad-road decision flag FAKR shown in FIGS. 7 or 19 is set or reset. In the shown embodiment, when the road surface condition determination system determines that the vehicle is driving on a bad road, that is, in case of FAKR=1, the pressure-reduction threshold value λ1 used at step 125 is designed to be set at a lower value rather than during good-road driving condition, so as to somewhat lower the response of the system to pressure-reduction control during driving on bad roads.

Figure 6:
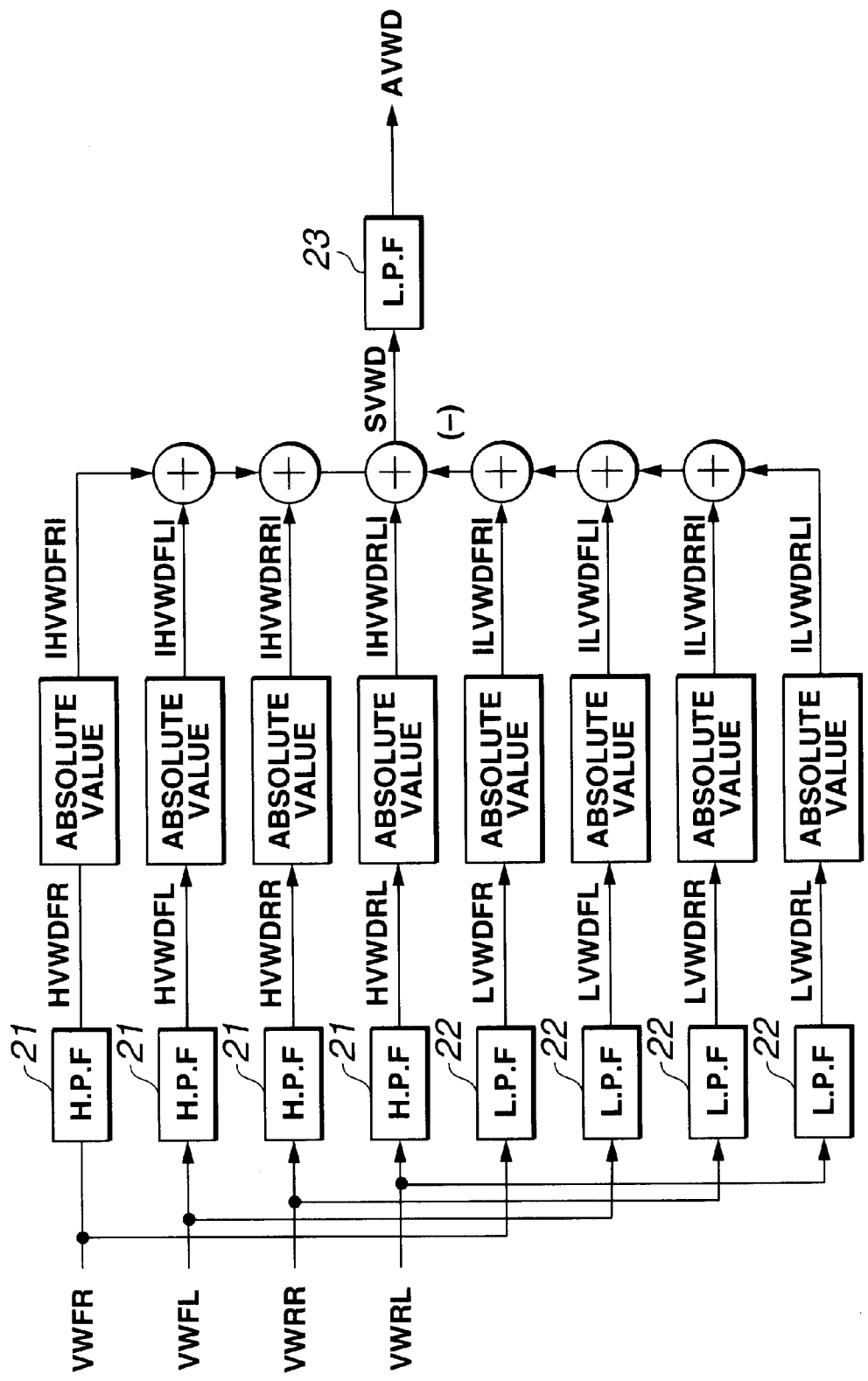
FIG. 6 is an operational block diagram illustrating essential system components of the road surface condition determination system of the first embodiment.

Details of the bad-road determination routine of steps 102 through 110 are described hereunder in reference to FIGS. 6 and 7.

Referring now to FIGS. 6 and 7, the data processing actions executed by the system of the first embodiment are illustrated. FIG. 6 shows the data signal flow within the arithmetic sections (containing 10 Hz-high-pass filters 21, 5 Hz-low-pass filters 22, conversion-to-absolute-value circuits, adders, a subtracter, and a 0.5 Hz-smoothing-low-pass filter 23) of the CPU of the ECU 12. FIG. 7 illustrates details of the arithmetic operations (steps 102–109) and bad-road decision routine (step 110), executed by the system of the first embodiment. As shown in FIG. 6, the front-right wheel speed data VWFR, the front-left wheel speed data VWFL, the rear-right wheel speed data VWRR, and the rear-left wheel speed data VWRL are transmitted to respective high-pass filters (21, 21, 21, 21), to produce the four wheel-speed fluctuation data (HVWDFR, HVWDFL, HVWDRR, HVWDRL). In the same manner, the wheel speed data (VWFR, VWFL, VWRR, VWRL) are transmitted to respective low-pass filters (22, 22, 22, 22), to produce the four skid-control dependent wheel-speed fluctuation data (LVWDFR, LVWDFL, LVWDRR, LVWDRL). These filter-processed data signals (HVWDFR, HVWDFL, HVWDRR, HVWDRL, LVWDFR, LVWDFL, LVWDRR, LVWDRL) are transmitted to respective conversion-to-absolute-value circuits, to produce absolute-value data signals (|HVWDFR|, |HVWDFL|, |HVWDRR|, |HVWDRL|, |LVWDFR|, |LVWDFL|, |LVWDRR|, |LVWDRL|) of the filter-processed data. Thereafter, a data signal corresponding to the sum (|HVWDFR|+|HVWDFL|+|HVWDRR|+|HVWDRL|) of the four absolute values of the four high-pass-filtered wheel-speed fluctuation data is produced by way of adders, and at the same time a data signal corresponding to the sum (|LVWDFR|+|LVWDFL|+|LVWDRR|+|LVWDRL|) of the four absolute values of the four low-pass-filtered wheel-speed fluctuation data is produced by way of adders. Then, a data signal corresponding to the wheel-speed fluctuation correction value SVWD is produced by subtracting the sum (|LVWDFR|+|LVWDFL|+|LVWDRR|+|LVWDRL|) of the four absolute values of the four low-pass-filtered wheel-speed fluctuation data from the sum (|HVWDFR|+|HVWDFL|+|HVWDRR|+|HVWDRL|) of the four absolute values of the four high-pass-filtered wheel-speed fluctuation data by way of a subtracter. After this, the processed data signal SVWD indicative of the wheel-speed fluctuation correction value is further sent to a low-pass filter 23, to produce a smoothed-value data signal AVWD. In the system of the first embodiment, a 10 Hz-high-pass filter having a cutoff frequency of 10 Hz is used as the high-pass filter 21, a 5 Hz-low-pass filter having a cutoff frequency of 5 Hz is used as the low-pass filter 22, and a 0.5 Hz-low-pass filter having a cutoff frequency of 0.5 Hz is used as the low-pass filter 23.

According to the bad-road determination routine of FIG. 7, first of all, at steps 401–404 corresponding to step 102 of FIG. 4, the front-right wheel-speed fluctuation HVWFR, the front-left-wheel-speed fluctuation HVWFL, the rear-right wheel-speed fluctuation HVWRR, and the rear-left wheel-speed fluctuation HVWRL are obtained by means of the respective first-order high-pass filters (21, 21, 21, 21). The filtering operations executed by the four first-order high-pass filters 21 are represented by the following expressions.

$$HVWFR=K1\times(VWFR-VWFR\_1)+K2\times HVWFR\_1$$

$$HVWFR=K1\times(VWFR-VWFR\_1)+K2\times HVWFR\_1$$

$$HVWFR=K1\times(VWFR-VWFR\_1)+K2\times HVWFR\_1$$

$$HVWFR=K1\times(VWFR-VWFR\_1)+K2\times HVWFR\_1$$

where VW (VWFR, VWFL, VWRR, VWRL) means $VW_{(n)}$, that is, a current value (a more recent data) of the wheel speed data, VW_1 (VWFR_1, VWFL_1, VWRR_1, VWRL_1) means $VW_{(n-1)}$, that is, a previous value of the wheel speed data, HVW_1 (HVWFR_1, HVWFL_1, HVWRR_1, HVWRL_1) means $HVW_{(n-1)}$, that is, a previous value of the high-pass-filtered wheel speed data (a previous value of the wheel-speed fluctuation data), and K1 and K2 denote predetermined filter factors which are preprogrammed to provide the first-order high-pass filter 21. In the system of the embodiment, note that the predetermined cutoff frequency of the first-order high-pass filter 21 is set at a predetermined value, such as 10 Hz, lower than the resonance frequency of unsprung mass of the vehicle, so as to provide a single transmission frequency band extending from the predetermined cutoff frequency (i.e., 10 Hz) up to infinite frequency. The first-order high-pass filter 21 serves to pass signals at a frequency above the predetermined cutoff frequency (10 Hz) and to attenuate signals with a frequency below the predetermined cutoff frequency (10 Hz). Owing to the suitable setting of the cutoff frequency of the first-order high-pass filter 21, the system of the first embodiment can effectively reasonably extract only frequency components corresponding to wheel-speed fluctuations based on input vibrations transmitted from the road surface from the wheel speed data signals (VWFR, VWFL, VWRR, VWRL). Next at steps 405–408 corresponding to step 103 of FIG. 4, the absolute-values (AHVWFR, AHVWFL, AHVWRR, AHVWRL) of the four wheel-speed fluctuation data (HVWFR, HVWFL, HVWRR, HVWRL) are obtained by means of the respective conversion-to-absolute-value circuits. The arithmetic operations executed by the conversion-to-absolute-value circuits are represented by the following expressions.

$$AHVWFR=ABS(HVWFR)$$

$$AHVWFR=ABS(HVWFR)$$

$$AHVWFR=ABS(HVWFR)$$

$$AHVWFR=ABS(HVWFR)$$

where AHVW (AHVWFR, AHVWFL, AHVWRR, AHVWRL) means the absolute value of the high-pass-filtered wheel speed data (the wheel-speed fluctuation data HVW), and ABS(HVW) is an absolute function of the wheel-speed fluctuation data HVW. By the provision of the conversion-to-absolute-value circuits (see steps 405–408), the system of the first embodiment can extract the wheel-speed fluctuation component in a direction decreasing the wheel speed VW as well as the wheel-speed fluctuation component in a direction decreasing the wheel speed VW. At steps 409–412 corresponding to step 105 of FIG. 4, the front-right skid-control dependent wheel-speed fluctuation LVWFR, the front-left skid-control dependent wheel-speed fluctuation LVWFL, the rear-right skid-control dependent wheel-speed fluctuation LVWRR, and the rear-left skid-control dependent wheel-speed fluctuation LVWRL are obtained by means of the respective first-order low-pass filters (22, 22, 22, 22). The filtering operations executed by the four first-order low-pass filters 22 are represented by the following expressions.

$$LVWFR=K3\times(VWFR+VWFR\_1)+K4\times LVWFR\_1$$

$$LVWFR=K3\times(VWFR+VWFR\_1)+K4\times LVWFR\_1$$

$$LVWFR=K3\times(VWFR+VWFR\_1)+K4\times LVWFR\_1$$

$$LVWFR=K3\times(VWFR+VWFR\_1)+K4\times LVWFR\_1$$

where VW (VWFR, VWFL, VWRR, VWRL) means $VW_{(n)}$, that is, a current value (a more recent data) of the wheel speed data, VW_1 (VWFR_1, VWFL_1, VWRR_1, VWRL_1) means $VW_{(n-1)}$, that is, a previous value of the wheel speed data, LVW_1 (LVWFR_, LVWFL_1, LVWRR_, LVWRL_1) means $LVW_{(n-1)}$, that is, a previous value of the low-pass-filtered wheel speed data (a previous value of the skid-control dependent wheel-speed fluctuation data), and K3 and K4 denote predetermined filter factors which are preprogrammed to provide the first-order low-pass filter 22. In the system of the first embodiment, note that the predetermined cutoff frequency of the first-order low-pass filter 22 is set at a predetermined value, such as 5 Hz, lower than the resonance frequency of unsprung mass of the vehicle or lower than the predetermined cutoff frequency of the first-order high-pass filter 21, so as to provide a single transmission frequency band extending from zero to the predetermined cutoff frequency such as 5 Hz. The first-order low-pass filter 22 serves to pass signals at a frequency below the predetermined cutoff frequency for example 5 Hz and to attenuate signals with a frequency above the predetermined cutoff frequency (5 Hz). Owing to the suitable setting of the cutoff frequency of the first-order low-pass filter 22, the system of the first embodiment can effectively extract frequency components corresponding to wheel-speed fluctuations occurring owing to the pressure-reduction mode and the pressure build-up mode repeatedly executed by the ABS system during skid control. Subsequently to step 412, a series of steps 413–416 (similar to steps 405–408) are executed. At steps 413–416 corresponding to step 106 of FIG. 4, the absolute values (ALVWFR, ALVWFL, ALVWRR, ALVWRL) of the four skid-control dependent wheel-speed fluctuation data (LVWFR, LVWFL, LVWRR, LVWRL) are obtained by means of the respective conversion-to-absolute-value circuits. The arithmetic operations executed by the conversion-to-absolute-value circuits are represented by the following expressions.

$$ALVWFR=ABS(LVWFR)$$

$$ALVWFR=ABS(LVWFR)$$

$$ALVWFR=ABS(LVWFR)$$

$$ALVWFR=ABS(LVWFR)$$

where ALVW (ALVWFR, ALVWFL, ALVWRR, ALVWRL) means the absolute value of the low-pass-filtered wheel speed data (the skid-control dependent wheel-speed fluctuation data LVW), and ABS(LVW) is an absolute function of the skid-control dependent wheel-speed fluctuation data LVW. By the provision of the conversion-to-absolute-value circuits (see steps 413–416), the system of the first embodiment can extract the skid-control dependent wheel-speed fluctuation component in a direction decreasing the wheel speed VW as well as the wheel-speed fluctuation component in a direction decreasing the wheel speed VW.

At step 417 of steps 417–419 corresponding to step 107 of FIG. 4, the wheel-speed fluctuation correction value SVW is arithmetically calculated by subtracting an integrated value (ALVWFR+ALVWFL+ALVWRR+ALVWRL) of the four absolute values (ALVWFR, ALVWFL, ALVWRR, ALVWRL) of the skid-control dependent wheel-speed fluctuation data (LVWFR, LVWFL, LVWRR, LVWRL) from an integrated value (AHVWFR+AHVWFL+AHVWRR+AHVWRL) of the four absolute values (AHVWFR, AHVWFL, AHVWRR, AHVWRL) of the wheel-speed fluctuation data (HVWFR, HVWFL, HVWRR, HVWRL), from the following expression.

$$SVW=(AHVWFR+AHVWFL+AHVWRR+AHVWRL)-(ALVWFR+ALVWFL+ALVWRR+ALVWRL)$$

That is, the data signal indicative of the wheel-speed fluctuation correction value SVW corresponds to a data signal obtained by removing or eliminating the skid-control dependent wheel-speed fluctuation components occurring owing to skid control from the integrated value of the absolute values of the high-pass-filtered wheel-speed fluctuation data (i.e., the data signal corresponding to fluctuations in the unsprung-mass resonance frequency components, extracted at all of the four road wheels). By virtue of steps 418 and 419, the wheel-speed fluctuation correction value SVW is limited to a predetermined lower limit such as "0". Concretely, at step 418, a check is made to determine whether the wheel-speed fluctuation correction value SVW calculated through step 417 is less than the predetermined lower limit such as "0". In case of SVW<0, the routine proceeds to step 419. At step 419, the wheel-speed fluctuation correction value SVW is set at "0". In case of SVW≧0, the routine jumps from step 418 to step 420. In this case, the wheel-speed fluctuation correction value SVW calculated at step 417 is directly used at step 420. At step 420 corresponding to step 109 of FIG. 4, the smoothing operation is made to the wheel-speed fluctuation correction value SVW by means of a first-order, smoothing low-pass filter 23, to produce a smoothed value AVWD. The filtering operation (the smoothing operation) of the first-order, smoothing low-pass filter 23 is represented by the following expression.

$$AVWD=K5\times(SVW-SVW\_1)+K6\times AVW\_1$$

where AVWD denotes the smoothed value, SVW means $SVW_{(n)}$, that is, a current value (a more recent data) of the wheel-speed fluctuation correction value indicative data, SVW_1 means $SVW_{(n-1)}$, that is, a previous value of the wheel-speed fluctuation correction value indicative data, AVW_1 means $AVW_{(n-1)}$, that is, a previous value of the smoothed value, and K5 and K6 denote predetermined filter factors which are preprogrammed to provide the first-order, smoothing low-pass filter 23. In the system of the first embodiment, note that the predetermined cutoff frequency of the first-order, smoothing low-pass filter 23 is set at a predetermined value, such as 0.5 Hz, lower than the predetermined cutoff frequency of the first-order high-pass filter 21, and lower than the predetermined cutoff frequency of the first-order low-pass filter 22, so as to provide a single transmission frequency band extending from zero to the predetermined cutoff frequency such as 0.5 Hz. The first-order, smoothing low-pass filter 23 serves to pass signals at a frequency below the predetermined cutoff frequency for example 0.5 Hz and to attenuate signals with a frequency above the predetermined cutoff frequency (0.5 Hz).

Then, at the decision box of step 421, the smoothed value AVWD is compared to a predetermined threshold value such as 2G. When the smoothed value AVWD is greater than or equal to the predetermined threshold value (2G), the ECU 12 determines that the current road surface condition is bad, and thus the routine proceeds to step 422. At step 422, the bad-road decision flag FAKR is set at "1". Conversely, when the smoothed value AVWD is less than the predetermined threshold value (2G), the ECU 12 determines that the current road surface condition is good, and thus the routine proceeds to step 423. At step 423, the bad-road decision flag FAKR is reset or cleared to "0". After this, at step 424, the previous value VW_1 (VWFR_1, $VW_{FL}$_1, VWRR_1, VWRL_1) of the wheel speed data is updated by the current value VW (VWFR, VWFL, VWRR, VWRL).

Figure 8:
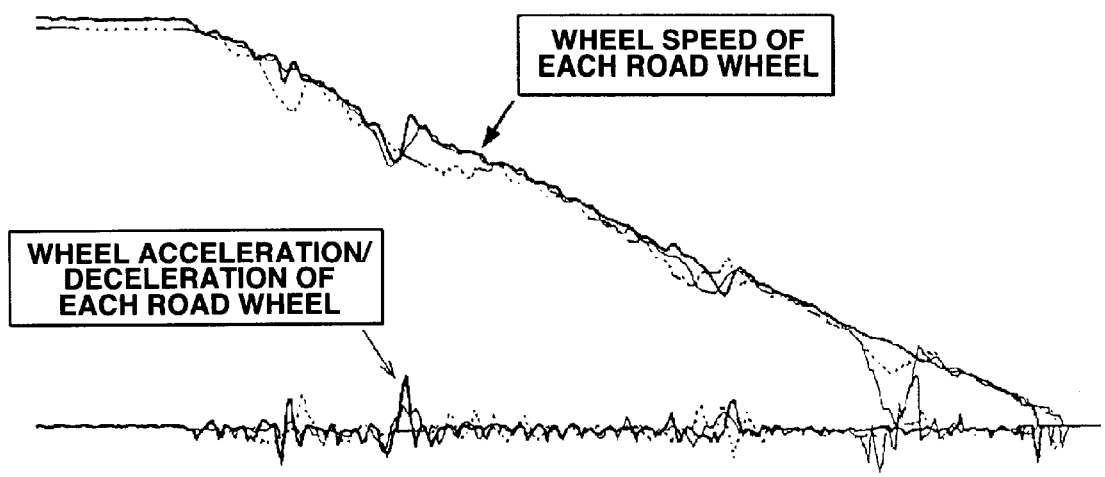
FIG. 8 is a timing chart illustrating waveforms of data signals for wheel speeds (VWFR, VWFL, VWRR), and wheel accelerations/decelerations (VWDFR, VWDFL, VWDRR), extracted during good-road driving.
Figure 9:
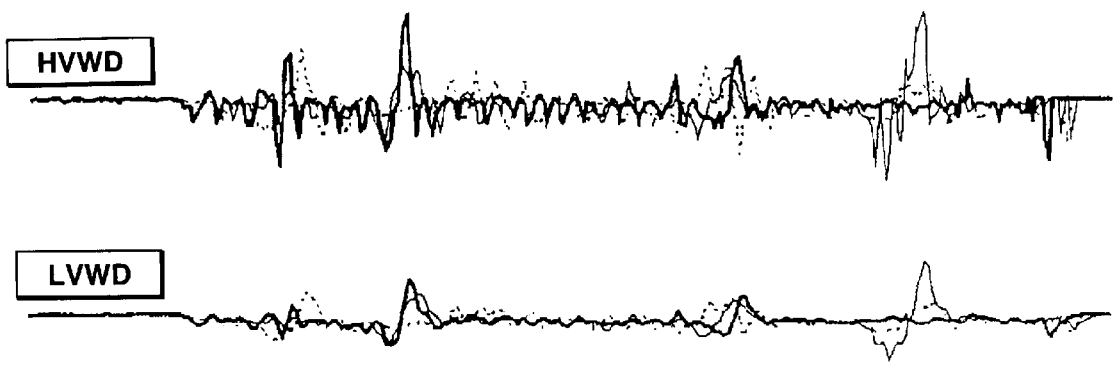
FIG. 9 are timing charts illustrating waveforms of data signals with frequency components corresponding to wheel-speed fluctuations (HVWDFR, HVWDFL, HVWDRR, produced with 10 Hz-H.P.F.) and data signals with frequency components corresponding to skid-control dependent wheel-speed fluctuations (LVWDFR, LVWDFL, LVWDRR, produced with 5 Hz-L.P.F.), extracted during good-road driving.

Hereunder described in reference to FIGS. 8–11 are details of the system operation executed by the system of the first embodiment, when the anti-skid braking system (simply, ABS system) comes into operation during driving on good road such as dry pavements. Referring to FIG. 8, there are shown variations in the front-right, front-left and rear-right wheel speeds VWFR, VWFL and VWRR, and variations in the front-right, front-left and rear-right wheel accelerations (exactly, wheel accelerations/decelerations) VWDFR, VWDFL and VWDRR, obtained when the brakes are applied during good-road driving. In case of test results shown in FIG. 8, the brakes are applied hard that the wheels tend to stop turning, and thus a skid starts to develop. As a result of this, the ABS system comes into operation and partly releases the brakes so that the wheels continue to rotate. On the other hand, FIG. 9 shows signal waveforms of the 10 Hz-high-pass-filtered wheel-speed fluctuation data (HVWDFR, HVWDFL, HVWDRR) produced by the first-order high-pass filtering operation (see step 102 of FIG. 4) and signal waveforms of the 5 Hz-low-pass-filtered wheel-speed fluctuation data (LVWDFR, LVWDFL, LVWDRR) produced by the first-order low-pass filtering operation (see step 105 of FIG. 4), obtained when the wheel speeds VW (VWFR, VWFL, VWRR) vary as shown in FIG. 8. FIG. 10 shows signal waveforms of an integrated value |ΣAHVWD| of the absolute values (AHVWDFR, AHVWDFL, AHVWDRR) of the 10 Hz-high-pass-filtered wheel-speed fluctuation data (HVWDFR, HVWDFL, HVWDRR), an integrated value |ΣALVWD| of the absolute values (ALVWDFR, ALVWDFL, ALVWDRR) of the 5 Hz-low-pass-filtered wheel-speed fluctuation data (LVWDFR, LVWDFL, LVWDRR), and a derivative (a differentiated value) SVWD of the wheel-speed-fluctuation correction value SVW (see step 107 of FIG. 4) obtained as the difference between the two integrated values |ΣAHVWD| and |ΣALVWD|, produced during good-road driving. FIG. 11 shows signal waveforms of an integrated value of the wheel-speed-fluctuation correction value (exactly, the derivative SVWD of the wheel-speed-fluctuation correction value) and a smoothed value AVWD produced by the previously-described smoothing operation made to the derivative SVWD of the wheel-speed-fluctuation correction value, during good-road driving. As clearly seen in FIG. 11, during the vehicle driving on good road, the signal waveform of the smoothed value AVWD indicates a low signal level.

Figure 12:
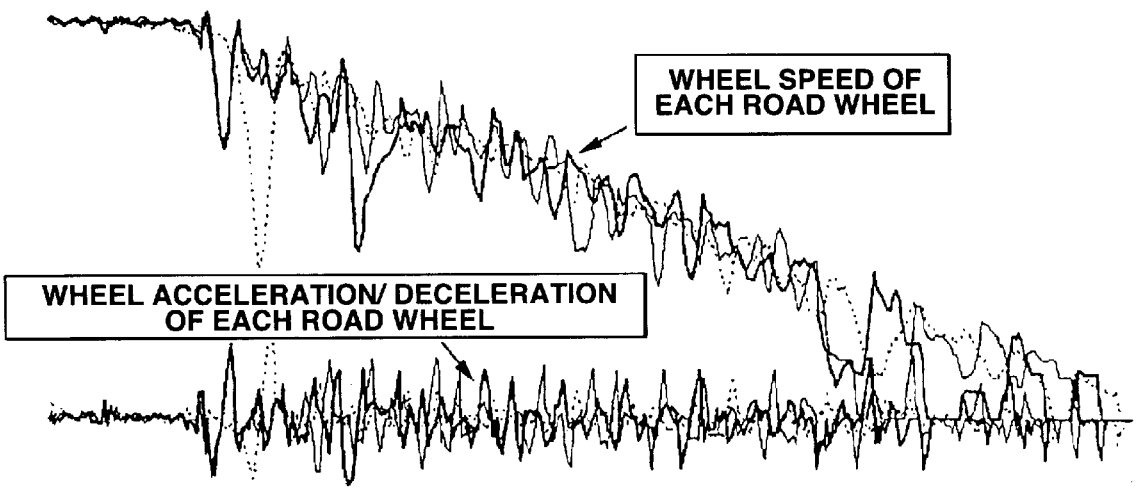
FIG. 12 is a timing chart illustrating waveforms of data signals for wheel speeds (VWFR, VWFL, VWRR), and wheel accelerations/decelerations (VWDFR, VWDFL, VWDRR), extracted during bad-road driving.
Figure 13:
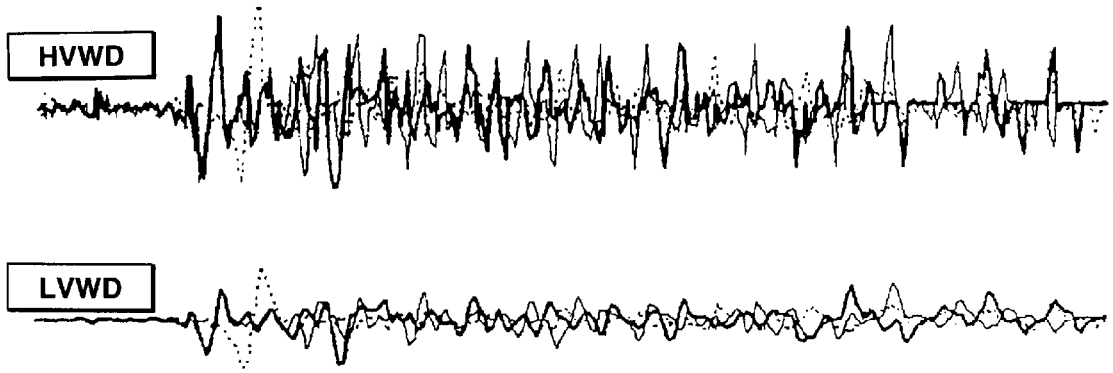
FIG. 13 are timing charts illustrating waveforms of data signals with frequency components corresponding to wheel-speed fluctuations (HVWDFR, HVWDFL, HVWDRR, produced with 10 Hz-H.P.F.) and data signals with frequency components corresponding to skid-control dependent wheel-speed fluctuations (LVWDFR, LVWDFL, LVWDRR, produced with 5 Hz-L.P.F.), extracted during bad-road driving.

Hereunder described in reference to FIGS. 12–15 are details of the system operation executed by the system of the first embodiment, when the ABS system comes into operation during driving on bad road such as gravel roads. Referring to FIG. 12, there are shown variations in the wheel speeds VWFR, VWFL and VWRR, and variations in the wheel accelerations/decelerations VWDFR, VWDFL and VWDRR, obtained when the brakes are applied during bad-road driving. In case of test results shown in FIG. 12, the brakes are applied hard that the wheels tend to stop turning, and thus a skid starts to develop. As a result of this, the ABS system comes into operation and partly releases the brakes so that the wheels continue to rotate. FIG. 13 shows signal waveforms of the 10 Hz-high-pass-filtered wheel-speed fluctuation data (HVWDFR, HVWDFL, HVWDRR) produced by the first-order high-pass filtering operation (see step 102 of FIG. 4) and signal waveforms of the 5 Hz-low-pass-filtered wheel-speed fluctuation data (LVWDFR, LVWDFL, LVWDRR) produced by the first-order low-pass filtering operation (see step 105 of FIG. 4), obtained when the wheel speeds VW (VWFR, VWFL, VWRR) vary as shown in FIG. 12. FIG. 14 shows signal waveforms of an integrated value |ΣAHVWD| of the absolute values (AHVWDFR, AHVWDFL, AHVWDRR) of the 10 Hz-high-pass-filtered wheel-speed fluctuation data (HVWDFR, HVWDFL, HVWDRR), an integrated value |ΣALVWD| of the absolute values (ALVWDFR, ALVWDFL, ALVWDRR) of the 5 Hz-low-pass-filtered wheel-speed fluctuation data (LVWDFR, LVWDFL, LVWDRR), and a derivative (a differentiated value) SVWD of the wheel-speed-fluctuation correction value SVW (see step 107 of FIG. 4) obtained as the difference between the two integrated values |ΣAHVWD| and |ΣALVWD|, produced during bad-road driving. FIG. 15 shows signal waveforms of an integrated value of the wheel-speed-fluctuation correction value (exactly, the derivative SVWD of the wheel-speed-fluctuation correction value) and a smoothed value AVWD produced by the previously-described smoothing operation made to the derivative SVWD of the wheel-speed-fluctuation correction value, during bad-road driving. As clearly seen in FIG. 15, during the vehicle driving on bad road, the signal waveform of the smoothed value AVWD indicates a high signal level.

Figure 16:
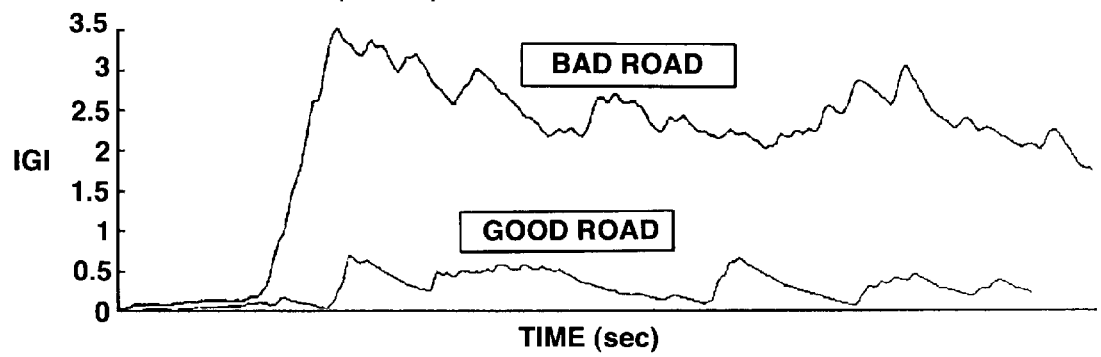
FIG. 16 is a timing chart illustrating the result of comparison between the smoothed value AVWD produced during good-road driving and the smoothed value AVWD produced during bad-road driving.

The two signal waveforms shown in FIG. 16 correspond to the variations in the smoothed value AVWD obtained during the bad-road driving and the variations in the smoothed value AVWD obtained during the good-road driving. In FIG. 16, in order to clearly compare the smoothed-value indicative data signal AVWD obtained during the bad-road driving with the smoothed-value indicative data signal AVWD obtained during the good-road driving, the two smoothed-value indicative data signal AVWD picked up from FIGS. 11 and 15 are scaled up. In FIG. 16, there is a remarkable difference between the signal level of the smoothed value AVWD produced during the bad-road driving and the signal level of the smoothed value AVWD produced during the good-road driving. As appreciated from the comparison between the two signal waveforms shown in FIG. 16, in order for the road surface condition determination system to accurately determine or discriminate a current road surface condition in real time, it is advantageous to use the previously-noted smoothed-value indicative data signal SVWD rather than variances for the four acceleration/deceleration data at road wheels.

Figure 17:
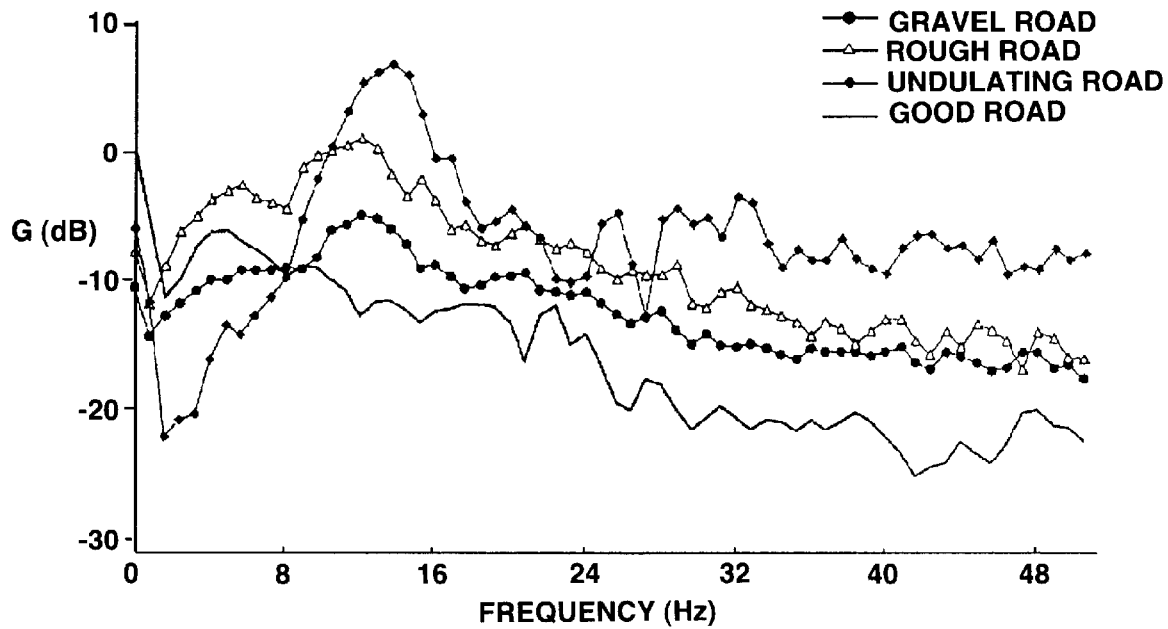
FIG. 17 illustrates frequency characteristics of wheel acceleration/deceleration varying during braking, depending on four different road surface conditions.

Referring now to FIG. 17, there is shown the result of comparison of frequency characteristics of wheel-speed fluctuation data (wheel acceleration/deceleration data), obtained when the brakes are applied during driving on various road surface conditions, namely on gravel road, on rough road, on undulating road, and on good road. As seen from the frequency characteristics of FIG. 17, in the high-frequency range containing the resonance frequency of unsprung mass, the data obtained during gravel-road driving indicates the highest level in wheel-speed fluctuation. The data obtained during rough-road driving indicates the second highest level. The data obtained during good-road driving indicates the lowest level. The data obtained during undulating-road driving indicates the second lowest level. In this manner, there is a remarkable difference of wheel-speed fluctuation signal level, depending on the road surface condition.

As discussed above, according to the system of the first embodiment, the wheel-speed fluctuation data HVW (HVWDFR, HVWDFL, HVWDRR, HVWDRL) are calculated from the current values VW (VWFR, VWFL, VWRR, VWRL) of the wheel speed data and the previous values VW_1 (VWFR_1, VWFL_1, VWRR_1, VWRL_1) of the wheel speed data. Their absolute-value data AHVW (AHVWFR, AHVWFL, AHVWRR, AHVWRL) are integrated to produce an integrated-value data (AHVWFR+AHVWFL+AHVWRR+AHVWRL). Likewise, the skid-control dependent wheel-speed fluctuation data LVW (LVWDFR, LVWDFL, LVWDRR, LVWDRL) are calculated from the current values VW (VWFR, VWFL, VWRR, VWRL) of the wheel speed data and the previous values VW_1 (VWFR_1, VWFL_1, VWRR_1, VWRL_1) of the wheel speed data. Their absolute-value data ALVW (ALVWFR, ALVWFL, ALVWRR, ALVWRL) are integrated to produce the integrated value (ALVWFR+ALVWFL+ALVWRR+ALVWRL). Then, the wheel-speed-fluctuation correction value SVW is calculated as the difference between the integrated-value data (AHVWFR+AHVWFL+AHVWRR+AHVWRL) and the integrated-value data (ALVWFR+ALVWFL+ALVWRR+ALVWRL). The smoothed value AVW is calculated by executing the smoothing operation with regard to the wheel-speed-fluctuation correction value SVW. The system of the first embodiment makes a discrimination between good and bad roads, on the basis of the smoothed value AVW. Therefore, the system of the first embodiment provides the following effects.

(A) Hitherto, the variances for the four acceleration/deceleration data at road wheels were required for discrimination between good and bad roads. On the other hand, the improved system of the embodiment requires the smoothed value AVW in lieu of variances. In arithmetically calculating the smoothed value AVW, the system of the embodiment merely requires the previous values VW_1 (VWFR_, VWFL_1, VWRR_1, VWRL_1) of the wheel speed data, calculated one cycle before and stored in the predetermined memory addresses, and the current values (the latest up-to-date wheel-speed data) VW (VWFR, VWFL, VWRR, VWRL). In the system of the embodiment, the bad-road determination is made on the basis of the current wheel-speed data (VWFR, VWFL, VWRR, VWRL) and the previous wheel-speed data (VWFR_1, VWFL_1, VWRR_1, VWRL_1). As compared to the conventional system using the variances, the system of the embodiment handles a comparatively small amount of data. This ensures reduced memory capacities and a short arithmetic-operation time for data processing. Such reduced memory capacities contributes to reduction in the total production costs of the system. Also, the system of the embodiment can execute a discrimination between bad and good roads for a brief moment. This realizes bad-road determination in real time with no time lag, thus ensuring enhanced accuracy of bad-road determination.

(B) The basic wheel-speed fluctuation data signals (produced by the first-order high-pass filters 21) of each road wheel are integrated within the ECU incorporated in the system of the embodiment, whereas the skid-control dependent wheel-speed fluctuation data signals (produced by the low-pass filters 22) of each road wheel are integrated within the ECU 12. These integrated values relating all of the four road wheels are used to calculate the smoothed value AVW. This enhances the accuracy of discrimination between good and bad roads.

(C) In the system of the embodiment, the frequency components corresponding to the skid-control dependent wheel-speed fluctuation data are removed or eliminated from the basic wheel-speed fluctuation data. Thus, it is possible to effectively extract only the wheel-speed fluctuation components occurring due to input from the road surface without undesiredly reducing the magnitude of the wheel-speed fluctuation data signal based on the input from the road surface. Thus, the system of the embodiment can discriminate between good and bad roads, without lowering the accuracy of arithmetic operations.

Figure 18:
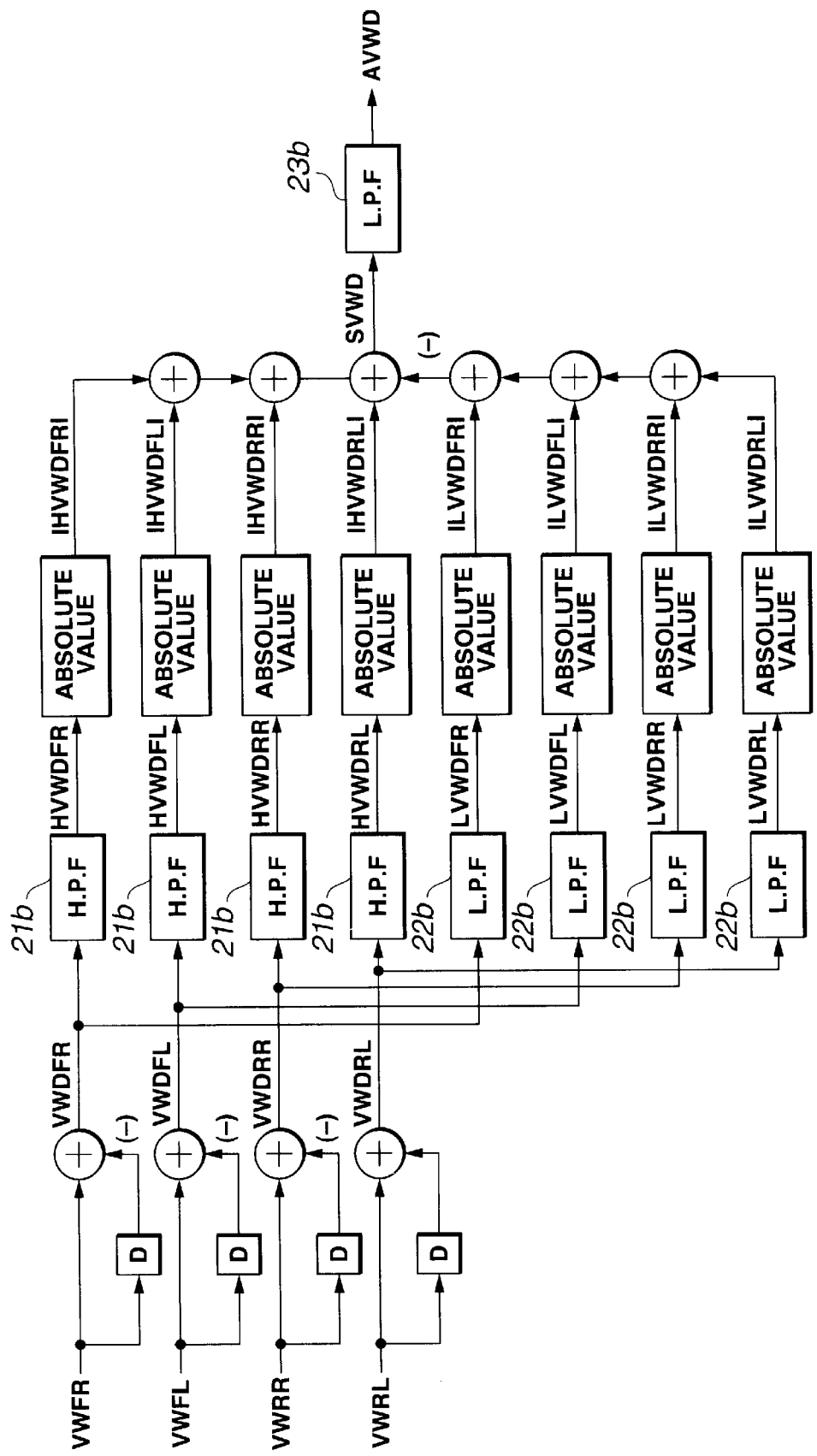
FIG. 18 is an operational block diagram illustrating essential system components of the road surface condition determination system of the second embodiment.

Referring now to FIGS. 18 and 19, the data processing actions executed by the system of the second embodiment are illustrated. The system of the second embodiment shown in FIGS. 18 and 19 is slightly different from the system of the first embodiment shown in FIGS. 6 and 7, in that, at the beginning of the data processing actions within the system of the second embodiment, the differential data VWD (=VW−VW_1) between a current value VW of wheel-speed data and a previous value VW_1 of wheel-speed data is first of all calculated and then the differential data VWD is transferred into a first-order high-pass filter 21b. The differential data VWD (VWDFR, VWDFL, VWDRR, VWDRL) is considered to be equivalent to the wheel acceleration data. FIG. 18 shows the data signal flow within the arithmetic sections (containing difference detecting circuits, 10 Hz-high-pass filters 21b, 5 Hz-low-pass filters 22b, conversion-to-absolute-value circuits, adders, a subtracter, and a 0.5 Hz-smoothing-low-pass filter 23b) of the CPU of the ECU 12. FIG. 19 illustrates details of the arithmetic operations (steps 102–109) and bad-road decision routine (step 110), executed by the system of the second embodiment. As shown in FIG. 18, the four wheel acceleration/deceleration data (simply four wheel acceleration data) VWDFR, VWDFL, VWDRR and VWDRL are calculated as the differential data (VWFR−VWFR_1), (VWFL−VWFL_1), (VWRR−VWRR_1) and (VWRL−VWRL_1) by way of the four difference detecting circuits (D, D, D, D). Thereafter, the wheel-acceleration data signals (VWDFR, VWDFL, VWDRR, VWDRL) are transmitted to respective first-order-high-pass filters (21b, 21b, 21b, 21b), to produce the four wheel-speed fluctuation data (HVWDFR, HVWDFL, HVWDRR, HVWDRL). In the same manner, the four wheel acceleration data (the four differential data) VWDFR, VWDFL, VWDRR and VWDRL are transmitted to respective first-order low-pass filters (22b, 22b, 22b, 22b), to produce the four skid-control dependent wheel-speed fluctuation data (LVWDFR, LVWDFL, LVWDRR, LVWDRL). These filter-processed data signals (HVWDFR, HVWDFL, HVWDRR, HVWDRL, LVWDFR, LVWDFL, LVWDRR, LVWDRL) are transmitted to respective conversion-to-absolute-value circuits, to produce absolute-value data signals (|HVWDFR|, |HVWDFL|, |HVWDRR|, |HVWDRL| |LVWDFR|, |LVWDFL|, |LVWDRR|, |LVWDRL|) of the filter-processed data. Thereafter, a data signal corresponding to the sum (|HVWDFR|+|HVWDFL|+|HVWDRR|+|HVWDRL|) of the four absolute values of the four high-pass-filtered wheel-speed fluctuation data is produced by way of adders, and simultaneously a data signal corresponding to the sum (|LVWDFR|+|LVWDFL|+|LVWDRR|+|LVWDRL|) of the four absolute values of the four low-pass-filtered wheel-speed fluctuation data is produced by way of adders. Then, a data signal corresponding to the wheel-speed fluctuation correction value SVWD is produced by subtracting the sum (|LVWDFR|+|LVWDFL|+LVWDRR|+LVWDRL|) of the four absolute values of the four low-pass-filtered wheel-speed fluctuation data from the sum (|HVWDFR|+|HVWDFL|+|HVWDRR|+|HVWDRL|) of the four absolute values of the four high-pass-filtered wheel-speed fluctuation data by way of a subtracter. After this, the processed data signal SVWD indicative of the wheel-speed fluctuation correction value is further sent to a first-order, smoothing low-pass filter 23b, to produce a smoothed-value data signal AVWD. In the system of the second embodiment, a 10 Hz-high-pass filter having a cutoff frequency of 10 Hz is used as the high-pass filter 21b, a 5 Hz-low-pass filter having a cutoff frequency of 5 Hz is used as the low-pass filter 22b, and a 0.5 Hz-low-pass filter having a cutoff frequency of 0.5 Hz is used as the low-pass filter 23b. According to the bad-road determination routine of FIG. 19, first, at steps 501–504, the front-right wheel acceleration data VWDFR, the front-left wheel acceleration data VWDFL, the rear-right wheel acceleration data VWDRR and the rear-left wheel acceleration data VWDRL are calculated respectively as the differential data (VWFR−VWFR_1) between the current value of front-right wheel-speed data and the previous value of front-right wheel-speed data, the differential data (VWFL−VWFL_1) between the current value of front-left wheel-speed data and the previous value of front-left wheel-speed data, the differential data (VWRR−VWRR_1) between the current value of rear-right wheel-speed data and the previous value of rear-right wheel-speed data, and the differential data (VWRL−VWRL_1) between the current value of rear-left wheel-speed data and the previous value of rear-left wheel-speed data. Steps 505 through 528 executed after step 504 are similar to steps 401 through 424 shown in FIG. 7. At steps 505–508 corresponding to step 102 of FIG. 4, the front-right, front-left, rear-right and rear-left wheel-speed fluctuations HVWFR, HVWFL, HVWRR, and HVWRL are obtained by means of the respective first-order high-pass filters (21b, 21b, 21b, 21b). The filtering operations executed by the four first-order high-pass filters 21b are represented by the following expressions.

$$HVWDFR = K1 \times (VWDFR - VWDFR\_1) + K2 \times HVWDFR\_1$$

$$HVWDFR = K1 \times (VWDFR - VWDFR\_1) + K2 \times HVWDFR\_1$$

$$HVWDFR = K1 \times (VWDFR - VWDFR\_1) + K2 \times HVWDFR\_1$$

$$HVWDFR = K1 \times (VWDFR - VWDFR\_1) + K2 \times HVWDFR\_1$$

where VWD (VWDFR, VWDFL, VWDRR, VWDRL) means $VWD_{(n)}$, that is, a current value (a more recent data) of the wheel acceleration data, VWD_1 (VWDFR_1, VWDFL_1, VWDRR_1, VWDRL_1) means $VWD_{(n-1)}$), that is, a previous value of the wheel acceleration data, HVWD_1 (HVWDFR_1, HVWDFL_1, HVWDRR_1, HVWDRL_1) means $HVWD_{(n-1)}$, that is, a previous value of the high-pass-filtered wheel acceleration data (a previous value of the wheel-speed fluctuation data), and K1 and K2 denote predetermined filter factors which are preprogrammed to provide the first-order high-pass filter 21b. In the system of the embodiment, note that the predetermined cutoff frequency of the first-order high-pass filter 21b is set at a predetermined value, such as 10 Hz, lower than the resonance frequency of unsprung mass of the vehicle, so as to provide a single transmission frequency band extending from the predetermined cutoff frequency (i.e., 10 Hz) up to infinite frequency. Owing to the suitable setting of the cutoff frequency of the first-order high-pass filter 21b, the system of the second embodiment can effectively reasonably extract only frequency components corresponding to wheel-speed fluctuations based on input vibrations transmitted from the road surface from the wheel speed data signals (VWFR, VWFL, VWRR, VWRL). Next at steps 509–512 corresponding to step 103 of FIG. 4, the absolute values (AHVWDFR, AHVWDFL, AHVWDRR, AHVWDRL) of the four wheel-speed fluctuation data (HVWDFR, HVWDFL, HVWDRR, HVWDRL) are obtained by means of the respective conversion-to-absolute-value circuits. The arithmetic operations executed by the conversion-to-absolute-value circuits are represented by the following expressions.

$$AHVWDFR=ABS(HVWDFR)$$

$$AHVWDFR=ABS(HVWDFR)$$

$$AHVWDFR=ABS(HVWDFR)$$

$$AHVWDFR=ABS(HVWDFR)$$

where AHVWD (AHVWDFR, AHVWDFL, AHVWDRR, AHVWDRL) means the absolute value of the high-pass-filtered wheel acceleration data (the wheel-speed fluctuation data HVWD), and ABS(HVWD) is an absolute function of the wheel-speed fluctuation data HVWD. By the provision of the conversion-to-absolute-value circuits (see steps 509–512), the system of the second embodiment can extract the wheel-speed fluctuation component in a direction decreasing the wheel speed VW as well as the wheel-speed fluctuation component in a direction decreasing the wheel speed VW.

At steps 513–516 corresponding to step 105 of FIG. 4, the front-right skid-control dependent wheel-speed fluctuation LVWDFR, the front-left skid-control dependent wheel-speed fluctuation LVWDFL, the rear-right skid-control dependent wheel-speed fluctuation LVWDRR, and the rear-left skid-control dependent wheel-speed fluctuation LVWDRL are obtained by means of the respective first-order low-pass filters (22b, 22b, 22b, 22b). The filtering operations executed by the four first-order low-pass filters 22b are represented by the following expressions.

$$LVWDFR=K3\times(VWDFR+VWDFR\_1)+K4\times LVWDFR\_1$$

$$LVWDFR=K3\times(VWDFR+VWDFR\_1)+K4\times LVWDFR\_1$$

$$LVWDFR=K3\times(VWDFR+VWDFR\_1)+K4\times LVWDFR\_1$$

$$LVWDFR=K3\times(VWDFR+VWDFR\_1)+K4\times LVWDFR\_1$$

where VWD (VWDFR, VWDFL, VWDRR, VWDRL) means $VWD_{(n)}$, that is, a current value (a more recent data) of the wheel acceleration data, VWD_1(VWDFR_1, VWDFL_1, VWDRR_1, VWDRL_1) means $VWD_{(n-1)}$, that is, a previous value of the wheel acceleration data, LVWD_1 (LVWDFR_1, LVWDFL_1, LVWDRR_1, LVWDRL_1) means $LVWD_{(n-1)}$, that is, a previous value of the low-pass-filtered wheel acceleration data (a previous value of the skid-control dependent wheel-speed fluctuation data), and K3 and K4 denote predetermined filter factors which are preprogrammed to provide the first-order low-pass filter 22b. In the system of the second embodiment, note that the predetermined cutoff frequency of the first-order low-pass filter 22b is set at a predetermined value, such as 5 Hz, lower than the resonance frequency of unsprung mass of the vehicle or lower than the predetermined cutoff frequency of the first-order high-pass filter 21b, so as to provide a single transmission frequency band extending from zero to the predetermined cutoff frequency such as 5 Hz. Owing to the suitable setting of the cutoff frequency of the first-order low-pass filter 22b, the system of the second embodiment can effectively extract frequency components corresponding to wheel-speed fluctuations occurring owing to the pressure-reduction mode and the pressure build-up mode repeatedly executed by the ABS system during skid control. Subsequently to step 516, a series of steps 517–520 are executed. At steps 517–520 corresponding to step 106 of FIG. 4, the absolute values (ALVWDFR, ALVWDFL, ALVWDRR, ALVWDRL) of the four skid-control dependent wheel-speed fluctuation data (LVWDFR, LVWDFL, LVWDRR, LVWDRL) are obtained by means of the respective conversion-to-absolute-value circuits. The arithmetic operations executed by the conversion-to-absolute-value circuits are represented by the following expressions.

$$ALVWDFR=ABS(LVWDFR)$$

$$ALVWDFR=ABS(LVWDFR)$$

$$ALVWDFR=ABS(LVWDFR)$$

$$ALVWDFR=ABS(LVWDFR)$$

where ALVWD (ALVWDFR, ALVWDFL, ALVWDRR, ALVWDRL) means the absolute value of the low-pass-filtered wheel acceleration data (the skid-control dependent wheel-speed fluctuation data LVWD), and ABS(LVWD) is an absolute function of the skid-control dependent wheel-speed fluctuation data LVWD. By the provision of the conversion-to-absolute-value circuits (see steps 517–520), the system of the second embodiment can extract the skid-control dependent wheel-speed fluctuation component in a direction decreasing the wheel speed VW as well as the wheel-speed fluctuation component in a direction decreasing the wheel speed VW. At step 521 of steps 521–523 corresponding to step 107 of FIG. 4, the wheel-speed fluctuation correction value SVWD is arithmetically calculated by subtracting an integrated value (ALVWDFR+ALVWDFL+ALVWDRR+ALVWDRL) of the four absolute values (ALVWDFR, ALVWDFL, ALVWDRR, ALVWDRL) of the skid-control dependent wheel-speed fluctuation data (LVWDFR, LVWDFL, LVWDRR, LVWDRL) from an integrated value (AHVWDFR+AHVWDFL+AHVWDRR+AHVWDRL) of the four absolute values (AHVWDFR, AHVWDFL, AHVWDRR, AHVWDRL) of the wheel-speed fluctuation data (HVWDFR, HVWDFL, HVWDRR, HVWDRL), from the following expression.

$$SVWD=(AHVWDFR+AHVWDFL+AHVWDRR+AHVWDRL)-(ALVWDFR+ALVWDFL+ALVWDRR+ALVWDRL)$$

By virtue of steps 522 and 523, the wheel-speed fluctuation correction value SVWD is limited to a predetermined lower limit such as "0". At step 522, a check is made to determine whether the wheel-speed fluctuation correction value SVWD calculated through step 521 is less than the predetermined lower limit such as "0". In case of SVWD<0, the routine proceeds to step 523. At step 523, the wheel-speed fluctuation correction value SVWD is set at "0". In case of SVWD≧0, the routine jumps from step 522 to step 524. In this case, the wheel-speed fluctuation correction value SVWD calculated at step 521 is directly used at step 524. At step 524 corresponding to step 109 of FIG. 4, the smoothing operation is made to the wheel-speed fluctuation correction value SVWD by means of a first-order, smoothing low-pass filter 23b, to produce a smoothed value AVWD. The filtering operation (the smoothing operation) of the first-order, smoothing low-pass filter 23b is represented by the following expression.

$$AVWD = K5 \times (SVWD - SVWD\_1) + K6 \times AVWD\_$$

where AVWD denotes a current value of the smoothed value, SVWD means $SVWD_{(n)}$, that is, a current value (a more recent data) of the wheel-speed fluctuation correction value indicative data, SVWD_1 means $SVWD_{(n-1)}$, that is, a previous value of the wheel-speed fluctuation correction value indicative data, AVWD_1 means $AVWD_{(n-1)}$, that is, a previous value of the smoothed value, and K5 and K6 denote predetermined filter factors which are preprogrammed to provide the first-order, smoothing low-pass filter 23b. In the system of the second embodiment, note that the predetermined cutoff frequency of the first-order, smoothing low-pass filter 23b is set at a predetermined value, such as 0.5 Hz, lower than the predetermined cutoff frequency of the first-order high-pass filter 21b, and lower than the predetermined cutoff frequency of the first-order low-pass filter 22b, so as to provide a single transmission frequency band extending from zero to the predetermined cutoff frequency such as 0.5 Hz. Then, at the decision box of step 525, the smoothed value AVWD is compared to a predetermined threshold value such as 5G. When the smoothed value AVWD is greater than or equal to the predetermined threshold value (5G), the ECU 12 determines that the current road surface condition is bad, and thus the routine proceeds to step 526. At step 526, the bad-road decision flag FAKR is set at "1". Conversely, when the smoothed value AVWD is less than the predetermined threshold value (5G), the ECU 12 determines that the current road surface condition is good, and thus the routine proceeds to step 527. At step 527, the bad-road decision flag FAKR is reset or cleared to "0". After this, at step 528, the previous value VW_1 (VWFR_1, VWFL_1, VWRR_1, VWRL_1) of the wheel speed data is updated by the current value VW (VWFR, VWFL, VWRR, VWRL). As discussed above, the system of the second embodiment shown in FIGS. 18 and 19 has the same effect as that of the first embodiment shown in FIGS. 6 and 7.

Although the road surface condition determination system of the invention is exemplified in an automotive vehicle with an ABS system, the road surface condition determination system of the invention may be applied to an automotive vehicle with an active suspension system which automatically varies a damping force of a shock absorber located at each road wheel, or to an automotive vehicle with an automatic levelling control system which automatically controls the relative position of the vehicle body to suspension system while using input information from a height sensor. For example, in the automotive vehicle employing the active-suspension system, the result of discrimination between bad and good roads may be used to suitably change the damping force created by the suspension depending on the road surface condition. In the automotive vehicle employing the automatic levelling control system, the result of discrimination between bad and good roads may be used to improve ride characteristics and passenger comfort, depending on the road surface condition. In the first and second embodiments, the system is constructed to remove or eliminate the skid-control dependent wheel-speed fluctuation components occurring due to pressure-reduction mode and pressure build-up mode repeatedly executed during skid control from the basic wheel-speed fluctuation data corresponding to fluctuations in the unsprung-mass resonance frequency components, extracted at all of the road wheels. As discussed above, in order to certainly sufficiently achieve the expected effects, it is preferable to eliminate the skid-control dependent wheel-speed fluctuation components from the basic wheel-speed fluctuation data. However, in order to nearly achieve the expected effects, the eliminating action of the skid-control dependent wheel-speed fluctuation components may be omitted. In the embodiments, for the purpose of enhancing the accuracy of arithmetic calculation for the smoothed value AVWD, that is, the accuracy of discrimination between good and bad roads, the smoothed value AVWD is computed on the basis of the wheel-speed fluctuation data of all of the four road wheels. Alternatively, the wheel-speed fluctuation data of two or three road wheels may be used to compute the smoothed value AVWD (or to determinate the road surface condition). As a matter of course, the smaller the number of the wheel-speed sensors mounted to the road wheels for picking up the wheel-speed fluctuation data, the memory capacities can be reduced. However, the smaller the number of the wheel-speed sensors, the lower the accuracy of discrimination between good and bad roads.

Figure 1:
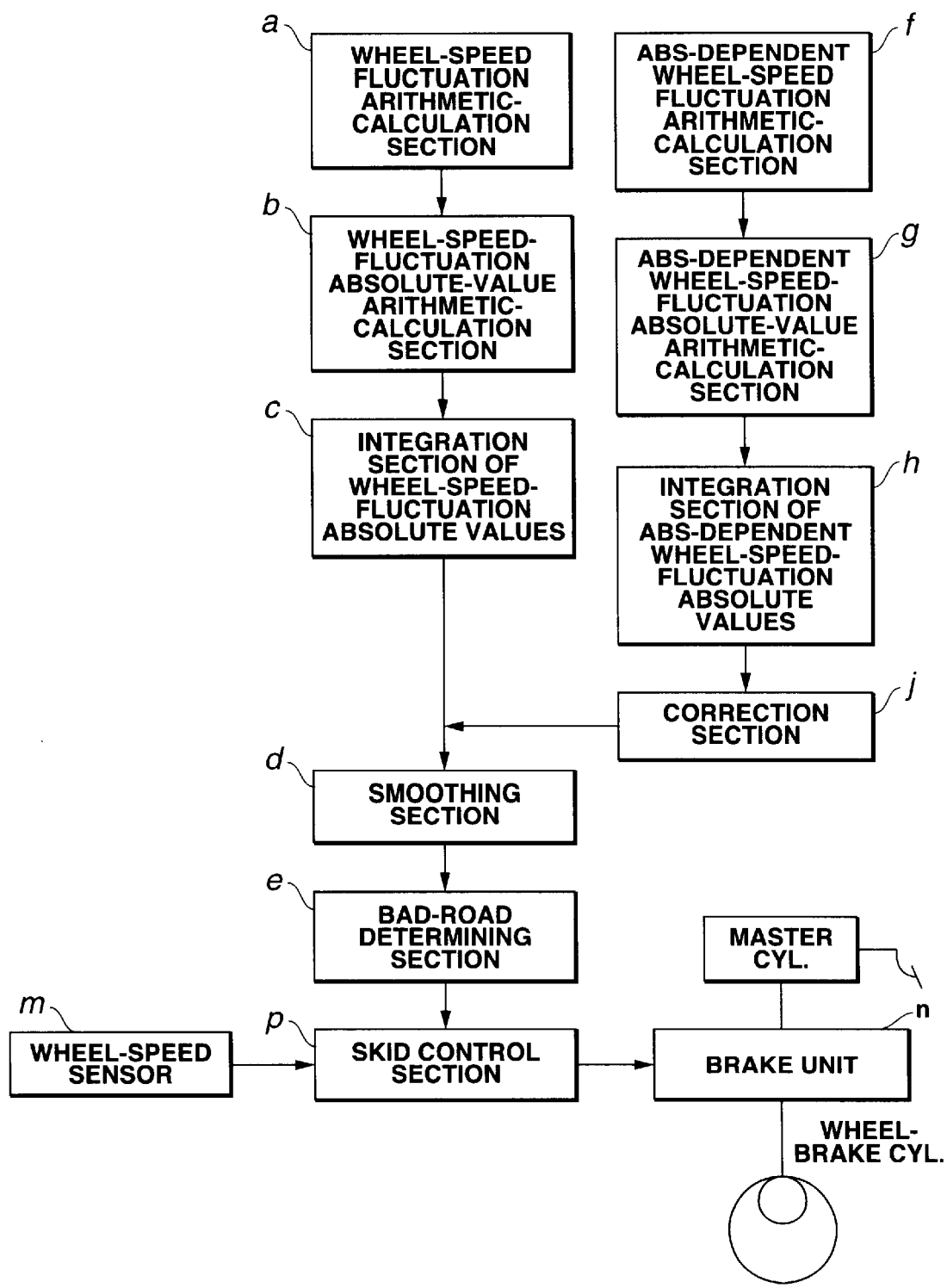
FIG. 1 is a block diagram illustrating a system structure of a road surface condition determination system and an anti-skid braking system of the invention.

Returning to FIG. 1, there is shown the fundamental system layout of the invention. As seen in FIG. 1, the road surface condition determination system of the invention includes at least a wheel-speed fluctuation arithmetic-calculation section a which calculates a wheel-speed fluctuation of each of road wheels on the basis of a previous value of wheel-speed data signal of each of the road wheels and a current value of wheel-speed data signal, a wheel-speed-fluctuation absolute-value arithmetic-calculation section b which calculates an absolute value of the wheel-speed fluctuation data of each of the road wheels, an integration section c which integrates the absolute values of the wheel-speed fluctuation data of the road wheels to produce an integrated value, a smoothing section d which makes a smoothing operation to the integrated value to produce a smoothed value, and a bad-road determining section or a road-surface condition determining section e which executes a discrimination between bad and good roads on the basis of the smoothed value. Signals from wheel-speed sensors m located at each road wheel are used as the wheel-speed data. In order to effectively reduce the amount of data, and from the viewpoint of reduced total system production costs, it is advantageous to use the smoothed value rather than variances. The arithmetic operations based on the previous value of wheel-speed data and the current value of wheel-speed data can ensure accurate bad-road-condition discrimination in real time. It is preferable that the wheel-speed fluctuation arithmetic-calculation section a is comprised of a first-order high-pass filter that passes wheel-speed data signals (or wheel-acceleration data signals) at a frequency above a predetermined cutoff frequency and attenuates the wheel-speed data signals (or the wheel-acceleration data signals) with a frequency below the predetermined cutoff frequency. The first-order high-pass filter has the predetermined cutoff frequency lower than a resonance frequency of unsprung mass of the vehicle, to cut off or attenuate frequency components (resonance frequency components of sprung mass except frequency components corresponding to input transmitted from the road surface through the tires) below the predetermined cutoff frequency from the wheel-speed data (or wheel-acceleration data), and consequently to extract the wheel-speed fluctuation components based on input from the road surface. In addition to the previously-noted sections a–e, an ABS-dependent wheel-speed fluctuation arithmetic-calculation section f which calculates an ABS-dependent wheel-speed fluctuation of each of the road wheels on the basis of the previous value of wheel-speed data signal of each of the road wheels and the current value of wheel-speed data signal, an ABS-dependent wheel-speed-fluctuation absolute-value arithmetic-calculation section g which calculates an absolute value of the ABS-dependent wheel-speed fluctuation of each of the road wheels, an integration section h which integrates the absolute values of the ABS-dependent wheel-speed fluctuation data of the road wheels to produce an integrated value, and a correction section j which calculates a wheel-speed fluctuation correction value by subtracting the integrated value (calculated by the integration section h) of the absolute values of the ABS-dependent wheel-speed fluctuation data from the integrated value (calculated by the integration section c) of the absolute values of the wheel-speed fluctuation data. Preferably, the previously-noted smoothing section d calculates a smoothed value from the wheel-speed fluctuation correction value calculated by the correction section j, and then the bad-road determining section e determines a bad-road condition on the basis of the smoothed value based on the wheel-speed fluctuation correction value calculated by the correction section j. In this case, the wheel-speed fluctuation components occurring due to skid control can be effectively removed or eliminated, thus enhancing the accuracy of discrimination between good and bad roads. It is preferable that the ABS-dependent wheel-speed fluctuation arithmetic-calculation section f is comprised of a first-order low-pass filter (a first first-order low-pass filter) that passes wheel-speed data signals (or wheel-acceleration data signals) at a frequency below a predetermined cutoff frequency and attenuates the wheel-speed data signals (or the wheel-acceleration data signals) with a frequency above the predetermined cutoff frequency. The first-order low-pass filter has the predetermined cutoff frequency lower than the resonance frequency of unsprung mass of the vehicle, to cut off or attenuate frequency components above the predetermined cutoff frequency from the wheel-speed data (or wheel-acceleration data), and consequently to eliminate frequency components (e.g., resonance frequency components of sprung mass) except the wheel-speed fluctuation components based on input from the road surface, and to extract the wheel-speed fluctuation components occurring due to skid control. Alternatively, the ABS-dependent wheel-speed fluctuation arithmetic-calculation section f may be comprised of a first-order low-pass filter (a second first-order low-pass filter) having a predetermined cutoff frequency lower than the predetermined cutoff frequency of the previously-noted first-order high-pass filter, to eliminate frequency components corresponding to input from the road surface and to extract the ABS-dependent wheel-speed fluctuation components. More preferably, the smoothing section d is comprised of a first-order low-pass filter having a predetermined cutoff frequency lower than the predetermined cutoff frequency of the first-order high-pass filter. The first-order high-pass filter, the first-order low-pass filter, and the first-order smoothing low-pass filter are simple in construction. This facilitates the system design. Alternatively, the smoothing section d may be comprised of a first-order low-pass filter having a predetermined cutoff frequency lower than the predetermined cutoff frequency of one of the first and second first-order low-pass filters, constructing the ABS-dependent wheel-speed fluctuation arithmetic-calculation section f.

In order to enhance the accuracy of skid control, in an anti-skid braking system having the wheel speed sensors m which detect wheel speeds of the respective road wheels, a hydraulic brake unit n which controls or regulates wheel-brake cylinder pressures in wheel-brake cylinders of the road wheels, and a skid-control section p which prevents wheel lock of each of the road wheels during braking in response to the wheel-speed data signals from the wheel-speed sensors m, it is advantageous to use the result of bad-road determination performed by the previously-noted road surface condition determination system. A rapid and accurate bad-road determination executed by the road surface condition determination system enables skid control in real time, depending on the result of bad-road determination. Preferably, when a bad road surface condition is detected, the skid control section p sets a pressure-reduction threshold value at a lower value as compared to a good road surface condition. This greatly enhances the accuracy of skid control.

The entire contents of Japanese Patent Application No. P11-039350 (filed Feb. 18, 1999) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A road surface condition determination system for an automotive vehicle, comprising:
    wheel-speed sensors detecting wheel speeds of each of road wheels; and
    a control unit being configured to be electrically connected to said wheel-speed sensors for processing a wheel-speed data signal from each of said wheel-speed sensors, said control unit comprising:
        (a) a wheel-speed fluctuation arithmetic-calculation section which calculates a wheel-speed fluctuation of each of the road wheels on the basis of a previous value of the wheel-speed data signal and a current value of the wheel-speed data signal,
        (b) a first absolute-value arithmetic-calculation section which calculates an absolute value of the wheel-speed fluctuation of each of the road wheels,
        (c) a first integration section which produces a first integrated value of the absolute values of the wheel-speed fluctuations of the road wheels,
        (d) a smoothing section which makes a smoothing operation to the first integrated value to produce a smoothed value, and
        (e) a road-surface condition determining section which determines a road surface condition on the basis of the smoothed value.

2. The road surface condition determination system as claimed in claim 1, wherein the wheel-speed fluctuation arithmetic-calculation section comprises a first-order high-pass filter that attenuates the wheel-speed data signal at a frequency below a predetermined cutoff frequency lower than a resonance frequency of unsprung mass.

3. The road surface condition determination system as claimed in claim 2, wherein said control unit comprises a skid-control dependent wheel-speed fluctuation arithmetic-calculation section which calculates a skid-control dependent wheel-speed fluctuation of each of the road wheels, occurring due to skid control, on the basis of a previous value of the wheel-speed data signal and a current value of the wheel-speed data signal, a second absolute-value arithmetic-calculation section which calculates an absolute value of the skid-control dependent wheel-speed fluctuation of each of the road wheels, a second integration section which produces a second integrated value of the absolute values of the skid-control dependent wheel-speed fluctuations of the road wheels, and a correction section which calculates a wheel-speed fluctuation correction value by subtracting the second integrated value from the first integrated value, and wherein said smoothing section makes the smoothing operation to the wheel-speed fluctuation correction value in lieu of the first integrated value to produce the smoothed value.

4. The road surface condition determination system as claimed in claim 3, wherein the skid-control dependent wheel-speed fluctuation arithmetic-calculation section comprises a first first-order low-pass filter that attenuates the wheel-speed data signal at a frequency above a predetermined cutoff frequency lower than the resonance frequency of unsprung mass.

5. The road surface condition determination system as claimed in claim 3, wherein the skid-control dependent wheel-speed fluctuation arithmetic-calculation section comprises a second first-order low-pass filter that attenuates the wheel-speed data signal at a frequency above a predetermined cutoff frequency lower than the predetermined cutoff frequency of the first-order high-pass filter.

6. The road surface condition determination system as claimed in claim 2, wherein the smoothing section comprises a first-order smoothing low-pass filter that attenuates the wheel-speed data signal at a frequency above a predetermined cutoff frequency lower than the predetermined cutoff frequency of the first-order high-pass filter.

7. The road surface condition determination system as claimed in claim 5, wherein the smoothing section comprises a first-order smoothing low-pass filter that attenuates the wheel-speed data signal at a frequency above a predetermined cutoff frequency lower than the predetermined cutoff frequency of one of the first and second first-order low-pass filters.

8. An anti-skid braking system having a road surface condition determination system for an automotive vehicle, comprising:

wheel-speed sensors detecting wheel speeds of each of road wheels;

a hydraulic brake unit regulating wheel-brake cylinder pressures of wheel-brake cylinders mounted to each of the road wheels; and a control unit being configured to be electrically connected to said wheel- speed sensors and hydraulic brake unit for processing a wheel-speed data signal from each of said wheel-speed sensors and for execute skid control based on the wheel-speed data signal from each of said wheel-speed sensors, said control unit comprising:

(a) a wheel-speed fluctuation arithmetic-calculation section which calculates a wheel-speed fluctuation of each of the road wheels on the basis of a previous value of the wheel-speed data signal and a current value of the wheel-speed data signal, (b) a first absolute-value arithmetic-calculation section which calculates an absolute value of the wheel-speed fluctuation of each of the road wheels, (c) a first integration section which produces a first integrated value of the absolute values of the wheel-speed fluctuations of the road wheels, (d) a skid-control dependent wheel-speed fluctuation arithmetic-calculation section which calculates a skid-control dependent wheel-speed fluctuation of each of the road wheels, occurring due to skid control, on the basis of a previous value of the wheel-speed data signal and a current value of the wheel-speed data signal, (e) a second absolute-value arithmetic-calculation section which calculates an absolute value of the skid-control dependent wheel-speed fluctuation of each of the road wheels, (f) a second integration section which produces a second integrated value of the absolute values of the skid-control dependent wheel-speed fluctuations of the road wheels, (g) a correction section which calculates a wheel-speed fluctuation correction value by subtracting the second integrated value from the first integrated value, (h) a smoothing section which makes a smoothing operation to the wheel-speed fluctuation correction value to produce a smoothed value, (i) a road-surface condition determining section which determines a road surface condition on the basis of the smoothed value, and (j) a skid control section preventing wheel lock of each of the road wheels in response to the wheel-speed data signal from each of the wheel-speed sensors, said skid control section executing the skid control depending on the road surface condition determined by the road-surface condition determining section.

9. The anti-skid braking system as claimed in claim 8, wherein, when a bad road surface condition is detected by the road surface condition determining section, the skid control section sets a pressure-reduction threshold value at a lower value as compared to a road surface condition except the bad road surface condition.

10. A road surface condition determination system for an automotive vehicle, comprising:

wheel-speed sensors detecting wheel speeds of each of road wheels; and a control unit being configured to be electrically connected to said wheel-speed sensors for processing a wheel-speed data signal from each of said wheel-speed sensors, said control unit comprising:

(a) a wheel-acceleration arithmetic-calculation section which calculates a wheel-acceleration data signal as a difference between a previous value of the wheel-speed data signal and a current value of the wheel-speed data signal, (b) a wheel-speed fluctuation arithmetic-calculation section which calculates a wheel-speed fluctuation of each of the road wheels on the basis of the wheel-acceleration data signal, (c) a first absolute-value arithmetic-calculation section which calculates an absolute value of the wheel-speed fluctuation of each of the road wheels, (d) a first integration section which produces a first integrated value of the absolute values of the wheel-speed fluctuations of the road wheels, (e) a smoothing section which makes a smoothing operation to the first integrated value to produce a smoothed value, and (f) a road-surface condition determining section which determines a road surface condition on the basis of the smoothed value.

11. The road surface condition determination system as claimed in claim 10, wherein the wheel-speed fluctuation arithmetic-calculation section comprises a first-order high-pass filter that attenuates the wheel-acceleration data signal at a frequency below a predetermined cutoff frequency lower than a resonance frequency of unsprung mass.

12. The road surface condition determination system as claimed in claim 11, wherein said control unit comprises a skid-control dependent wheel-speed fluctuation arithmetic-calculation section which calculates a skid-control dependent wheel-speed fluctuation of each of the road wheels, occurring due to skid control, on the basis of a previous value of the wheel-acceleration data signal and a current value of the wheel-acceleration data signal, a second absolute-value arithmetic-calculation section which calculates an absolute value of the skid-control dependent wheel-speed fluctuation of each of the road wheels, a second integration section which produces a second integrated value of the absolute values of the skid-control dependent wheel-speed fluctuations of the road wheels, and a correction section which calculates a wheel-speed fluctuation correction value by subtracting the second integrated value from the first integrated value, and wherein said smoothing section makes the smoothing operation to the wheel-speed fluctuation correction value in lieu of the first integrated value to produce the smoothed value.

13. The road surface condition determination system as claimed in claim 12, wherein the skid-control dependent wheel-speed fluctuation arithmetic-calculation section comprises a first first-order low-pass filter that attenuates the wheel-acceleration data signal at a frequency above a predetermined cutoff frequency lower than the resonance frequency of unsprung mass.

14. The road surface condition determination system as claimed in claim 12, wherein the skid-control dependent wheel-speed fluctuation arithmetic-calculation section comprises a second first-order low-pass filter that attenuates the wheel-acceleration data signal at a frequency above a predetermined cutoff frequency lower than the predetermined cutoff frequency of the first-order high-pass filter.

15. The road surface condition determination system as claimed in claim 11, wherein the smoothing section comprises a first-order smoothing low-pass filter that attenuates the wheel-acceleration data signal at a frequency above a predetermined cutoff frequency lower than the predetermined cutoff frequency of the first-order high-pass filter.

16. The road surface condition determination system as claimed in claim 14, wherein the smoothing section comprises a first-order smoothing low-pass filter that attenuates the wheel-acceleration data signal at a frequency above a predetermined cutoff frequency lower than the predetermined cutoff frequency of one of the first and second first-order low-pass filters.

17. An anti-skid braking system having a road surface condition determination system for an automotive vehicle, comprising:
  wheel-speed sensors detecting wheel speeds of each of road wheels;
  a hydraulic brake unit regulating wheel-brake cylinder pressures of wheel-brake cylinders mounted to each of the road wheels; and
  a control unit being configured to be electrically connected to said wheel-speed sensors and hydraulic brake unit for processing a wheel-speed data signal from each of said wheel-speed sensors and for execute skid control based on the wheel-speed data signal from each of said wheel-speed sensors, said control unit comprising:
    (a) a wheel-acceleration arithmetic-calculation section which calculates a wheel-acceleration data signal as a difference between a previous value of the wheel-speed data signal and a current value of the wheel-speed data signal,
    (b) a wheel-speed fluctuation arithmetic-calculation section which calculates a wheel-speed fluctuation of each of the road wheels on the basis of a previous value of the wheel-acceleration data signal and a current value of the wheel-acceleration data signal,
    (c) a first absolute-value arithmetic-calculation section which calculates an absolute value of the wheel-speed fluctuation of each of the road wheels,
    (d) a first integration section which produces a first integrated value of the absolute values of the wheel-speed fluctuations of the road wheels,
    (e) a skid-control dependent wheel-speed fluctuation arithmetic-calculation section which calculates a skid-control dependent wheel-speed fluctuation of each of the road wheels, occurring due to skid control, on the basis of a previous value of the wheel-acceleration data signal and a current value of the wheel-acceleration data signal,
    (f) a second absolute-value arithmetic-calculation section which calculates an absolute value of the skid-control dependent wheel-speed fluctuation of each of the road wheels,
    (g) a second integration section which produces a second integrated value of the absolute values of the skid-control dependent wheel-speed fluctuations of the road wheels,
    (h) a correction section which calculates a wheel-speed fluctuation correction value by subtracting the second integrated value from the first integrated value,
    (i) a smoothing section which makes a smoothing operation to the wheel-speed fluctuation correction value to produce a smoothed value,
    (j) a road-surface condition determining section which determines a road surface condition on the basis of the smoothed value, and
    (k) a skid control section preventing wheel lock of each of the road wheels in response to the wheel-speed data signal from each of the wheel-speed sensors, said skid control section executing the skid control depending on the road surface condition determined by the road-surface condition determining section.

18. The anti-skid braking system as claimed in claim 17, wherein, when a bad road surface condition is detected by the road surface condition determining section, the skid control section sets a pressure-reduction threshold value at a lower value as compared to a road surface condition except the bad road surface condition.

* * * * *